United States Patent
James

(10) Patent No.: US 7,707,118 B2
(45) Date of Patent: Apr. 27, 2010

(54) ASYMMETRICAL ESCROW SYSTEM FOR USE IN NON-COOPERATIVE BARGAINING RELATIONSHIPS

(76) Inventor: Ring F. James, 89 Keene St., Providence, RI (US) 02906

(\*) Notice: Subject to any disclaimer, the term of this patent is extended or adjusted under 35 U.S.C. 154(b) by 1324 days.

(21) Appl. No.: 11/066,047

(22) Filed: Feb. 24, 2005

(65) Prior Publication Data
US 2006/0188100 A1 Aug. 24, 2006

(51) Int. Cl.
*G06F 17/60* (2006.01)
(52) U.S. Cl. .............................. 705/64; 705/42; 705/30; 705/37; 705/38; 705/39
(58) Field of Classification Search .................. 705/64, 705/42, 37, 38, 39, 30
See application file for complete search history.

(56) References Cited

U.S. PATENT DOCUMENTS

| 5,794,207 | A | 8/1998 | Walker et al. |
| 5,884,272 | A | 3/1999 | Walker et al. |
| 5,983,205 | A | 11/1999 | Brams et al. |
| 6,141,423 | A * | 10/2000 | Fischer ........................ 380/286 |
| 6,330,551 | B1 | 12/2001 | Burchetta et al. |
| 6,606,607 | B1 | 8/2003 | Martin et al. |
| 6,766,307 | B1 | 7/2004 | Israel et al. |
| 6,865,559 | B2 * | 3/2005 | Dutta ........................... 705/75 |
| 7,464,057 | B2 * | 12/2008 | Cole et al. .................... 705/42 |
| 2002/0073049 | A1* | 6/2002 | Dutta ........................... 705/75 |
| 2003/0055787 | A1* | 3/2003 | Fujii ............................ 705/44 |
| 2004/0093278 | A1 | 5/2004 | Burchetta et al. |

FOREIGN PATENT DOCUMENTS

JP  2002342684 A  * 11/2002

OTHER PUBLICATIONS

Black, Henry Campbell, M.A., Black's Law Dictionary (5th edition, 1979) St. Paul Minn.: West Publishing (p. 489: "Escrow," copy enclosed).
Schelling, Thomas C., (1960) The Strategy of Conflict, Cambridge: Harvard University Press (pp. 1-80, 142-148, 160-161, copies enclosed).
Schelling, Thomas C., (1966) Arms and Influence, New Haven: Yale University Press (pp. 92-93, 99-103, copies enclosed).
Rubin, J. and Brown, B., The Social Psychology of Bargaining and Negotiation, (1975), New York: Academic Press (pp. 81-125, 289, 299-300, copies enclosed).

\* cited by examiner

*Primary Examiner*—Pierre E Elisca

(57) ABSTRACT

An escrow system that comprises correlating confidential data defining a fixed condition or set of conditions for a release of escrow with data presented in an indefinite series of confidential presentations seeking to satisfy that condition or set of conditions. The system involves a process whereby the conditions for a release of the escrow are fixed (i.e. reduced to writing and not subject to change for a specified period of time) but are not fully disclosed to a party seeking a release of the escrow. Instead, a party seeking a release of the escrow is permitted to submit an indefinite number of confidential presentations seeking to satisfy all of those fixed conditions, both disclosed and undisclosed. The fact and contents of each such presentation are treated as confidential unless the presentation results in a determination by the System that all of the fixed conditions have been satisfied.

7 Claims, 3 Drawing Sheets

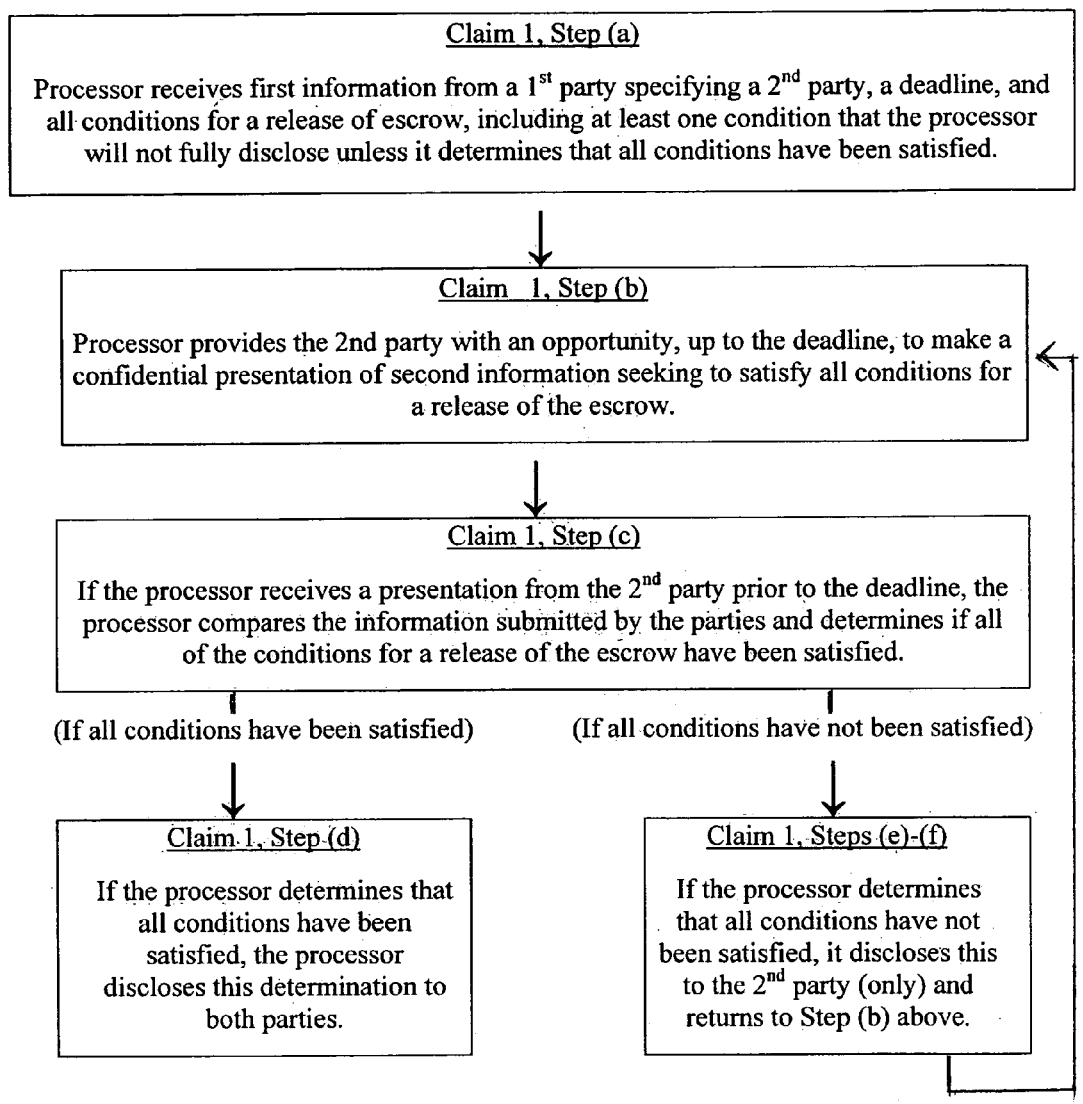
FIGURE 1: A STEP DIAGRAM OF THE METHOD DESCRIBED IN CLAIM 1

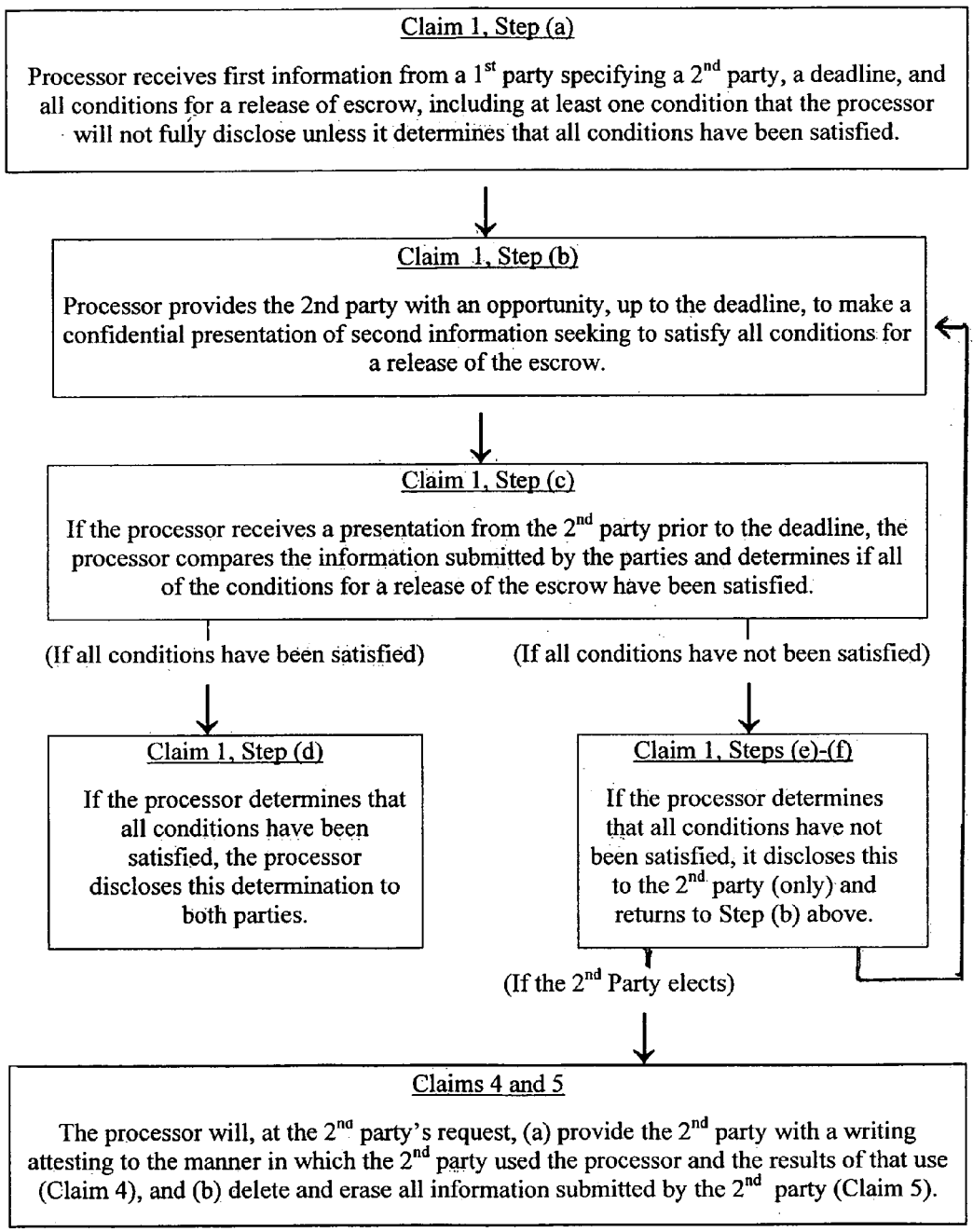
FIGURE 2: A STEP DIAGRAM OF THE METHOD DESCRIBED IN CLAIMS 1, 4 & 5

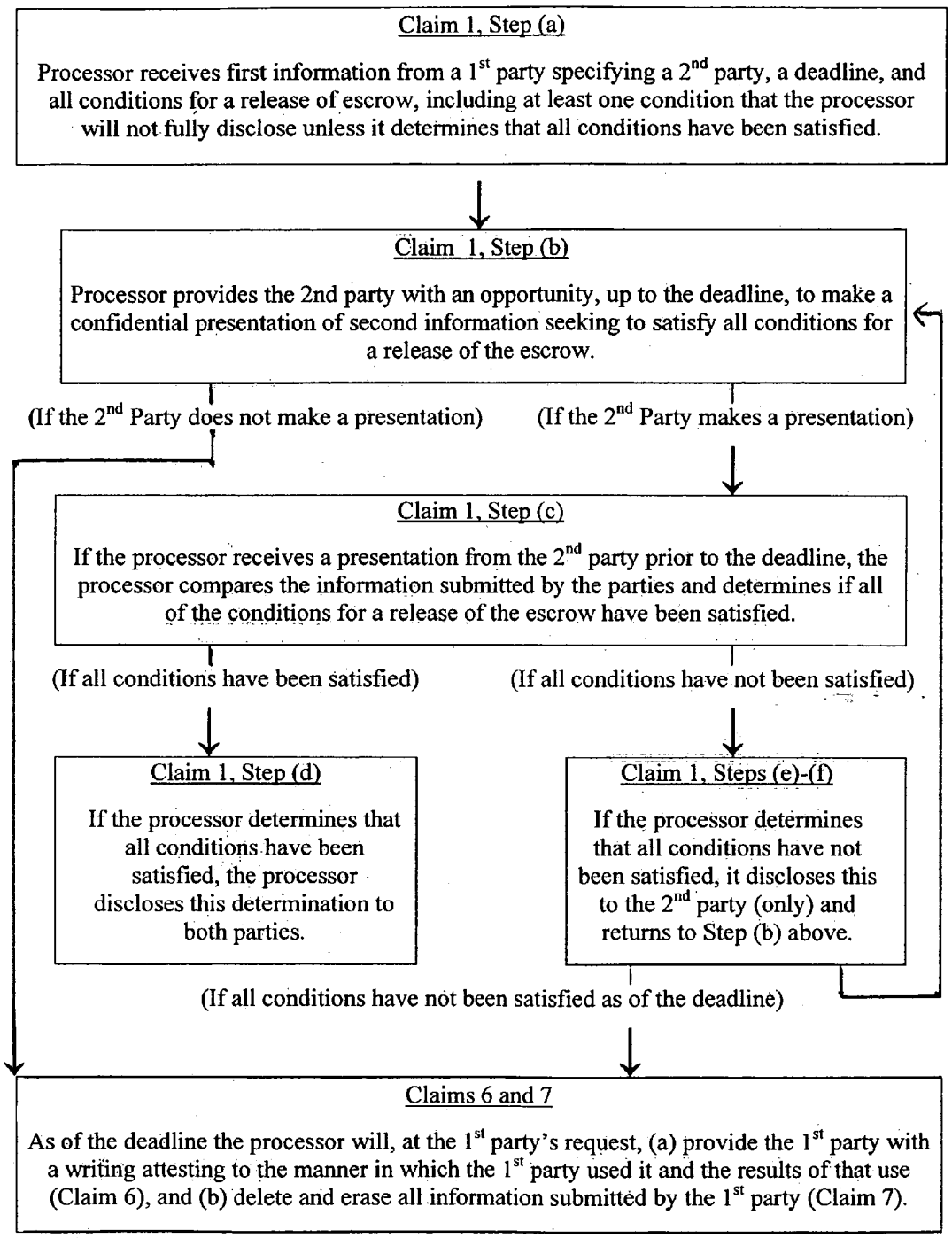
FIGURE 3: A STEP DIAGRAM OF THE METHOD DESCRIBED IN CLAIMS 1, 6 & 7

ASYMMETRICAL ESCROW SYSTEM FOR USE IN NON-COOPERATIVE BARGAINING RELATIONSHIPS

CROSS REFERENCE TO RELATED APPLICATIONS (Not Applicable.)

STATEMENT REGARDING FEDERALLY FUNDED RESEARCH OR DEVELOPMENT (Not Applicable.)

REFERENCE TO A SEQUENCE LISTING (Not Applicable.)

BACKGROUND OF THE INVENTION (1) Field of the Invention

The present invention is concerned generally with enhancing the ability of parties to engage in efficient bargaining. It has specific application and utility in situations where an aspect of the consideration (i.e., the thing of value) being sought by one of the parties is understood by at least one of the parties to be unavailable, or not readily available, from other sources (such as a buyout by one partner of another partner's interest in a partnership, a conveyance of closely held stock, or a contract for the provision of unique goods or services, etc.), with the result that the value that is ascribed to the consideration by one or both of the parties may be substantially influenced by their perception of the value placed on it by the other side, resulting in inefficiencies in the informational exchange and bargaining process that takes place between the parties. The invention provides a system or method whereby parties who find themselves in such situations may take unilateral steps to determine whether an outcome that they deem to be acceptable is acceptable to the other side, without first having to fully disclose that proposed outcome, or having to signify any willingness to consider compromise, to the other side. The invention does this by providing a unique system for the handling of escrow,[1] with the result that the operational and functional aspects of the invention will be most readily appreciated and understood by parties who are experienced in the use or provision of escrow services, such as law firms and banking institutions. (For example, the Inventor is an attorney experienced in the use and provision of escrow services and of escrow-based instruments, such as letters of credit, maritime letters of undertaking and bonds posted in admiralty proceedings.) The principles that underlie the invention, and that give rise to its utility, will be most readily appreciated and understood by game theorists, i.e., by economists, mathematicians, and [2]strategic analysts familiar with the study of "non-cooperative bargaining" as addressed in game theory and in studies of the so-called "strategy of conflict," as discussed infra at note 3.

(2) Background Art (I) The Art of Escrow

Because the invention that is the subject of this Disclosure consists of a method or system for processing escrow transactions, it involves, as a preliminary matter, the use of certain conventional steps that are commonly utilized in escrow arrangements and that are within the public domain. Under such conventional and traditional arrangements, a party (the "First Party") places something that is of value (the "escrow") into the hands of a neutral party (the "Escrow Agent"), and expressly authorizes the Escrow Agent, in a contractual undertaking between the First Party and the Escrow Agent (the "Escrow Contract"), to release the escrow into the hands of a second party (the "Second Party") if, within a period of time specified by the First Party (the "Escrow Period"), certain conditions specified within the Escrow Contract are satisfied. The conditions are "fixed conditions" in the sense that they cannot be withdrawn or altered during the Escrow Period. During the Escrow Period, the Second Party is provided with an opportunity to make presentations of documents or other data attempting to satisfy all of those fixed conditions or establish that all of those fixed conditions have been satisfied (a "presentation"). In the event that the fixed conditions have not been satisfied by the end of the Escrow Period, the Escrow Contract obliges the Escrow Agent to return the original escrow to the First Party. In the event that all of the fixed conditions have been satisfied, then that fact is disclosed to each of the parties, resulting in an exchange of the consideration that each was seeking. The arrangement between the parties is such that the First Party will have a cause of action against the Escrow Agent if the Escrow Agent fails to meet its obligations, and the Second Party will have a cause of action against the First Party and, potentially, the Escrow Agent if the Second Party satisfies the fixed conditions but the escrow is not released.

Within traditional escrow arrangements (but not within the invention that is the subject of this application, as summarized infra, all of the fixed conditions for a release of the escrow are fully disclosed and agreed to by all of the parties in advance in order to facilitate a satisfaction of those conditions and reduce the possibility of any misunderstandings between the parties. In addition, within traditional escrow arrangements (but not within the current invention), the fact and contents of any presentation made by the Second Party are not kept confidential from the First Party. Instead, the First Party is able, irrespective of whether or not a release of the escrow is achieved, to determine whether or not the Second Party has made a presentation to the Escrow Agent, and to review the contents of any such presentation. Furthermore, within traditional escrow arrangements (but not within the current invention), the Second Party is a party to the Escrow Contract, or to some other contractual arrangement with the parties to that contract, which serves to clarify his rights and obligations.

As was noted above, escrow systems utilizing the arrangements described above are routinely used and provided by law firms and banking institutions, and all of these arrangements are non-proprietary in nature and have long been within the public domain. As was also noted above (at note 1, supra), escrow arrangements are typically utilized in situations where at least one of the parties to a contemplated transaction lacks trust in the other party's good faith or willingness or ability to perform, with the result that a neutral third party (the Escrow Agent) is employed to secure the interests of each party. However, escrow systems do not solve all of the problems that may arise as a result of mistrust between the parties to a potential transaction, and escrow systems that are configured in a conventional manner do not provide a solution to the longstanding and intractable problem discussed below.

(II) Brief Description of the General Problem Addressed by the Invention

(1) Description of the Underlying Problem

Where an aspect of the consideration that is being sought or offered by at least one of the parties to a potential transaction is unique and not available from any other source (such as a buyout by one partner of another partner's interest in a partnership, or a conveyance of rights with respect to a unique geographic location, as distinct from goods or services that are commonly available on the public market, such as publicly traded stocks or commodities), the value of that aspect of the consideration cannot be readily determined by objective measures and is instead derived from the value that the parties themselves, acting as a willing buyer and a willing seller, ultimately agree to exchange it for within the context of their transaction. In such situations, the perceptions of each party as to the value that the other might be willing to place on the consideration may fundamentally affect the perceiving party's understanding of its actual value. Thus, in such situations, there is a very powerful incentive for each party to convey to the other a distorted impression of their own position, or to refuse to disclose their own position, in an effort to drive the other party's position in a desired direction. For example, the potential buyer in such a transaction is frequently unwilling to honestly disclose to the potential seller the price that the potential buyer might ultimately be willing to pay (and may not yet even know himself[3] what that price might be). Instead, he has an incentive to advance extreme positions on valuation that severely understate the price that he might actually be willing to pay. The potential seller, in turn, has an incentive to take positions that vastly overstate the price that he might ultimately be willing to accept. Moreover, even where the consideration does not clearly involve any unique aspects, a party who believes (correctly or incorrectly) that it has such aspects, or who believes that the other party may be operating under such a belief or would find it inconvenient to seek the consideration from some other source, will have similar incentives to convey distorted positions, and to formulate positions based upon perceptions of the positions being taken by the other side.[4]

Because a party's views on valuation may, in such situations, be significantly influenced by the positions taken on valuation by the other side, it is often the case that, at the outset of the negotiations, neither party has formed a firm, reasoned decision in his own mind as to what valuation might ultimately be acceptable. Instead, after each party takes a position reflecting their "best-case" hopes, each party attempts to induce the other to move, and to continue to move, in a desired direction by insisting that they will not move in the opposite direction, if at all, unless and until the other party does so. Within such contexts, each party is understandably concerned that any expression of a willingness to consider compromise that they might convey to the other side, such as an expression of a willingness to seek assistance from a mediator, will be interpreted as a sign of weakness, making it more difficult to keep the other side moving in the desired direction. (See generally, in this regard, *The Social Psychology of Bargaining and Negotiation*, cited supra, at note 3.)

In many of these situations, at least one of the parties either starts out with, or eventually arrives at a point where he has come to, a reasoned conclusion in his own mind as to what would constitute a reasonable and acceptable valuation or outcome. A party who has arrived at such a reasoned conclusion might fairly wonder whether the other party had done the same and whether the valuation arrived at by the other meets or overlaps with his own. However, the only way in which he can attempt to make an efficient, certain determination of whether the other party would be willing to enter into a binding contract based upon a given valuation is to present a firm offer setting forth that valuation. Yet, if he makes that offer, he runs a serious risk that the party to whom the offer is made will, instead of accepting it, simply interpret it as evidence of an ongoing willingness to compromise and as a new starting point from which to try to extract further concessions. This is, narrowly stated, the underlying phenomenon and problem that is addressed by the invention. As a result of this phenomenon, a party who has come to a reasoned decision as to what would constitute an acceptable outcome will be understandably reluctant to disclose it, or to in any way signify that he is harboring an undisclosed position which differs from his stated position, unless and until he is satisfied that his undisclosed position will be accepted.[5]

2) The Problem as it Arises in the Fiduciary Context.

The above-described phenomenon creates particularly acute distress in situations where one of the involved parties owes a fiduciary or similar duty to a third-party to consummate the transaction on reasonable terms, such as where one of the two parties involved in the negotiation of the transaction is a trustee, political executive, partner, or an officer in a closely held or public corporation, acting for the benefit of others who are not directly involved in the negotiations. A party in such a situation may feel duty-bound to refrain from conveying to the other side an offer setting forth his true position, or setting forth a position being urged upon him by a party to whom he owes a fiduciary duty, out of concern that it would simply prompt the other side to make further demands for concessions and make it much more difficult to consummate the transaction upon acceptable terms. However, if he refrains from doing so and the transaction is not subsequently consummated, he will find it difficult to defend himself against a claim by a party to whom he owed the duty that such an offer would have been accepted, and that his failure to convey such a firm, reasoned offer was the proximate cause of the failure to consummate the transaction on acceptable terms. This illustrates one of the paradoxes to which the underlying problem gives rise.

3) The Related Problem of Documentation.

A related problem arises out of the fact that parties involved in such situations generally refrain from drafting documents setting forth all of the terms that would be necessary to embody any agreement that they might ultimately arrive at on a fundamental issue until such time as they believe that they have arrived at an "agreement-in-principle" with the other side on the fundamental issue, such as the amount of money involved. In some instances, this is, in part, attributable to the fact that drafting such documents is perceived as expensive, an expense that may be difficult to justify in the event that an agreement on the fundamental issue is not subsequently achieved. One very negative aspect of this phenomenon with respect to documentation is that, in cases where the parties have gone through the very painful and potentially damaging process of exchanging information about their true positions and arrive at a point where they believe that they have, by making compromises, arrived at an agreement-in-principle on the fundamental issue, they may find themselves unable to agree upon the terms of the underlying documents, either because they failed to appreciate that some of those terms were fundamental as well, or because one side is looking for an excuse to back out of what was agreed to and uses the absence of an agreement on the other terms as an excuse to do so. In such situations, the position arrived at through a series of hard-fought negotiations and reluctant compromises becomes just another starting point for further attempts to extract concessions.

4) General Comment on the Public Interest.

The above-described problems create substantial inefficiencies in the informational exchange and bargaining process that takes place between such parties. This, in turn, may lead to a breakdown in discussions between the parties, with the result that contracts are not entered into, parties are unable to arrive at valuations that reflect the honest positions of the parties, liabilities are incurred, and resources are not paired with persons who, from an objective standpoint, value those resources more highly. These inefficiencies may also lead to attempts by one of the involved parties to pursue the desired object through some means other than a voluntary agreement with the other side. (See generally, in this regard, infra.) This phenomenon is, accordingly, adverse to the public interest, as well as adverse to the interests of the parties themselves.

(III) Brief Description of the Historical Responses to the General Problem

1) Introduction.

The options that have historically been available to a party trying to make unilateral progress within the context of a non-cooperative bargaining relationship have been limited, consistent with the fact that attempts to develop a conceptual or theoretical framework that might expand those options remain in a state of "infancy" (see, e.g., *Infinite-Horizon Models of Bargaining with One-Sided Incomplete Information*, cited supra at note 3). As was noted supra at note 3, there has been an historical recognition that bargaining involves, by definition, a "process of information seeking and disclosure . . . [by which] through the selective, strategic exchange of information . . . bargainers attempt to discover the other's true preferences, expectations and intentions while at the same time revealing as little as possible about their own." However, while the notion that a party who wishes to "attempt to discover the other's true preferences, expectations and intentions" should "reveal . . . as little as possible about their own," is intuitively understood, it begs the question of why someone who is engaged in such an attempt should reveal anything at all about their own true preferences, expectations and intentions. The historical answer has been that, in non-cooperative bargaining relationships, one is required to make at least limited revelations to the other party about one's own position or willingness to consider compromise in order to induce the other party to reveal information about that other party's true position, i.e., in order to be able to "attempt to discover the other's true preferences, expectations and intentions." (See generally, in this regard, *The Social Psychology of Bargaining and Negotiation*, cited supra, at note 3.) This historical answer is, however, ultimately unsatisfactory because it fails to take account of something that is not intuitively understood but that manifests itself in the inefficiencies encountered in non-cooperative bargaining as it takes place in the real world: while a revelation of true information by one party to the other may in some instances permit the revealing party to "discover the other's true" position, the true position that is "discovered" will, although it may well be objectively real and true, reflect a reality that has been fundamentally altered and defined by the information that was initially revealed. (See generally, in this regard, the discussion supra at note 4 and infra at note 12.)

2) Historical Options for Unilateral Action within the Context of Non-Cooperative Bargaining.

The most common historical methods of attempting to make unilateral progress within the context of a non-cooperative bargaining relationship reflect an implicit recognition of the above described fact. More specifically, the most common response by a party who is involved in a non-cooperative bargaining relationship and who has reached an apparent deadlock, but who is unwilling to abandon pursuit of the desired end or to simply surrender to the other side's stated position, does not consist of making further disclosures about his own "true preferences, expectations and intentions." Instead, a party who finds himself in that situation will typically seek to pursue the desired end through some means other than a voluntary agreement with the other side, such as through a resort to tactics involving intransigence, belligerence, intimidation, or force. Where the parties are both subjects of a single, sovereign entity, a legal system operated and enforced by that entity may place limits on such tactics, but it will also provide a forum where such tactics can still be used to significant effect.

The problems associated with the use of legal systems and military power to pursue desired ends have been the subject of centuries of commentary and are fairly self-evident.[6] For example, sovereign entities develop and enforce legal systems for the precise purpose of providing their citizens with an alternative to recourse to the use of force, because the use of force has always been recognized as antithetical to the development and maintenance of an ordered, civil society. However, the legal system as it exists in various societies also puts substantial strains upon those societies and upon parties who find themselves caught up in those systems, because, as with military conflict, legal conflict consumes enormous resources and often yields results that are ultimately unsatisfactory to all concerned. Rather than review the well recognized problems that arise when a party resorts to legal or military conflict, the discussion that follows simply discusses those problems as they relate to the process of information seeking and disclosure within the context of non-cooperative bargaining.[7]

As was noted above, recourse to legal or military pressure is frequently driven by a party's conviction that an attempt to make progress by signifying a willingness to compromise with the other side will inevitably cause the other side's position to move in an adverse direction, making it even more difficult to accomplish a desired end. However, just as a party who sends a signal of a willingness to consider further compromise in an effort to measure the willingness of the other side to do the same runs the risk that the sending of such a signal will result in "an uncontrollable exchange of energy between [the object to be observed] and the measuring instruments which would completely disturb the very energy balance we sought to investigate" (see, note 4, supra), a party's resort to legal or military conflict also inevitably involves the sending of signals to the other side which will result in powerful and uncontrollable exchanges of energy that may fundamentally alter the positions of the respective parties and affect their ability to achieve a desired result. (See, e.g., Schelling, *Arms and Influence*, and Powell, *In the Shadow of Power*, cited supra at note 6.) The difference is that a party who exerts legal or military force on the other side is not, in the initial exercise of that force, primarily interested in receiving a signal back from the other side as to the other side's position as it then exists, but is instead intent upon exerting sufficient energy on the other side to force the other side's position to move in a desired direction, such that a later measuring signal will result in a determination that the other side has arrived at a more acceptable position. Id. However, given the uncertainties that can be unleashed through an application of legal or military force and the enormity of the resources that may be required to initiate and sustain the application, it will be difficult for a party who resorts to such tactics, or who responds to such tactics in kind, to justify his decision unless it can be credibly established that the other side's true position started out at an unacceptable point and that the resources that were expended in inducing him to move were commensurate with, and were required to accomplish, the movement in that position that was ultimately obtained.[8] These problems point, again, to the utility of a method or system whereby a party could, prior to resorting to such methods or continuing to expend resources in pursuit of same, take unilateral steps to make a determination as to whether an outcome that he deems to be acceptable would be acceptable to the other side, without having to first signify any willingness to compromise or cooperate in order to make that determination.

3) Historical Responses to the Historical Options of Legal and Military Conflict.

The various systems and methods that have been developed in an effort to ameliorate legal or military conflict do not provide a system or method whereby a party can unilaterally seek to determine whether an outcome that he deems to be acceptable would be acceptable to the other side, without having to first signify any willingness to compromise or cooperate in order to make that determination. Instead, those methods and systems all involve persuading the parties to engage in bilateral action, i.e., to mutually agree to enter into an interim or alternative arrangement, and to engage in limited cooperation, in an effort to make progress (thus involving the conversion of a fundamentally non-cooperative relationship into one that is at least partially cooperative).[9] For example, interim agreements to submit to an appraisal process, mediation process or to binding arbitration allow two parties who are involved in an unproductive bargaining relationship but who are willing (i) to signify to each other a desire to change the nature or structure of the relationship (and, with respect to conflict resolution methods such as mediation, to signify a willingness to consider compromise), and (ii) to engage in at least limited cooperation with each other towards that end, to mutually alter the nature or structure of their relationship, transforming or "transcending" the original relationship and entering into a new, more cooperative and, potentially, more productive regime. However, such arrangements do not provide a system or method whereby a party involved in a relationship that is not only unproductive, but fundamentally non-cooperative, can make progress unilaterally within the context of the relationship as it then exists.

Although the historical development of such ameliorative arrangements reflects a substantial "felt need" for systems and methods to assist parties who are involved in unproductive relationships, such arrangements do not provide a solution where, for example, at least one of the involved parties believes that conveying any signal of potential cooperation or compromise would be adverse or potentially fatal to his ability to achieve a desired outcome. While many parties have sufficient trust in each other, or in the professionals whom they hire to assist them,[10] or in a given appraiser or mediator, to permit them to avail themselves of such arrangements, it is the perception of the Inventor, based upon more than twenty years of experience as an attorney providing assistance to fiduciaries seeking to make progress in transactions such as buy-outs of partnership interests and closely held stock, that a significant number of parties find themselves unable to use or effectively utilize such arrangements because of the general problem described above: either or both of the parties is concerned that any concession or expression of a willingness to consider compromise that they might convey will impact upon and irretrievably alter the other side's position, making it even more difficult to arrive at a reasonable or acceptable result. (See, in this regard, note 4, supra.)

4) Historical Developments with Respect to the Related Problem of Documentation.

The related problem described in the preceding section, concerning the breakdown of agreements after a disclosure of a party's true position on a fundamental issue due to actual or professed disagreements over terms that were not perceived as controversial, is an area in which substantial progress has been made due to the increasingly widespread availability of standardized forms and clauses that can be used in a wide range of transactions. Standardized forms that are readily available include standard form stock purchase agreements, assignments of rights, and standard form promissory notes in situations involving a promise to pay money. (See, for examples of the broad range of legal forms that are readily available on the world wide web, websites such as http://www.onecle.com/ operated by the California Continuing Legal Education Service, and http://www.ilrg.com/forms/ which contains an archive of standardized legal forms.) Such forms typically include a section setting forth the parties' agreement on fundamental issues, such as the value ascribed to the consideration, and contain other sections setting forth various standardized clauses governing issues that are usually less controversial. The increasing availability of such standardized forms has made it much easier for parties to clarify, in advance, the clauses that would be employed in the event that an agreement on fundamental issues were achieved.

(IV) Comment on the Invention and its Advantages in Relation to the Historical Responses 1) General Advantages of the Invention.

As may be seen from the Brief Summary of the Invention that is set forth within this Disclosure, the Asymmetrical Escrow System that is the subject of this patent application (the "System" or "invention") permits a party who has come to a reasoned decision in his own mind as to what would constitute an acceptable outcome to make a determination as to whether that outcome would be acceptable to the other side, without in any way acknowledging to the other side that he is willing to compromise his position on fundamental issues, and without disclosing his true position on such issues, unless and until a determination has been made that the other side shares the same position.[11] In sum, a party who initiates the use of the invention will not have conveyed anything more to the other side than that he has elected to make a so-called "take-it-or-leave-it" offer. In so doing, he will not be fully disclosing what that offer consists of, nor will he have given a signal of any willingness to compromise or consider alternative proposals from the other side. To the contrary, he will be expressing complete indifference to whatever alternative proposals the other side might wish to make, because the invention will not disclose any such alternative proposals to him. Similarly, the other party, if he responds by submitting presentations through the use of the invention, can do so with confidence that his election to do so, and any presentations that he might make to the System, will not be disclosed to the other side unless it turns out that the proposed outcome embodied in one of those confidential presentations is fully acceptable to both sides.

The invention also permits the utilization of standard forms and clauses, and thus allows a party using the invention to take advantage of the benefits flowing from the historical development of such materials. In addition, the invention does not prevent attorneys or other professionals hired by the parties from continuing to play a full and beneficial role in helping their clients to identify and achieve a reasonable and acceptable outcome. To the contrary, a party's ability to effectively use the invention increases in direct proportion to that party's understanding of, and confidence in, his position on what would constitute a reasonable and acceptable outcome.

However, because of the highly circumscribed nature of the information that a party can convey to, or derive from, the other party through the use of the invention in the event that a release of the escrow is not achieved, the invention does not provide an efficient platform for posturing or conveying distorted positions, and provides significant disincentives for such activities.[12] Thus, the invention facilitates the use of only those aspects of the historical response to the underlying general problem that are beneficial to society as a whole.

2) Specific Aspects of the Invention that Give Rise to its Advantages Over the Historical Options.

The utility of the invention arises out of several specific and novel characteristics, including (a) the fact that it can be initiated and utilized unilaterally by one party, without entering into an interim agreement with, or securing the consent or approval of, the other side (b) the fact that it is profoundly asymmetrical in nature, in the sense that the First Party's position is cast in stone during the period of the escrow, while the Second Party is permitted to continually modify his position without limitation throughout the course of that period unless and until the Second Party submits a presentation that yields a result that the Second Party has defined as acceptable; and (c) the fact that the First Party cannot determine, through the use of the invention, whether the Second Party has submitted any presentations at all unless and until a determination is made that a given presentation has satisfied all of the fixed conditions for a release of the escrow, which deprives the Second Party of a rational basis not to utilize the System in good faith. (Each of these aspects of the System constitutes, independently, an aspect that makes it an "asymmetrical system," as that phrase is used from time to time within this Disclosure.) These characteristics permit a party who has come to a reasoned decision in his own mind as to what would constitute an acceptable outcome,[13] and who wishes to determine whether that outcome would be acceptable to the other side, but who does not wish to disclose it out of concern that it will impair his ability to achieve that result, to unilaterally place the other party in a position, through the use of the invention, wherein the Second Party will have a strong incentive to formulate and make a series of realistic presentations.[14] However, those same characteristics also ensure that a Second Party who finds himself involuntarily thrust into that situation will, if he is rational, find the environment to be highly accommodating, because those same characteristics will allow him to pursue his own interests with complete anonymity and security, formulating and submitting confidential presentations with confidence that his efforts will not be disclosed unless he succeeds in achieving a result that he has deemed to be acceptable, and drawing inferences about the First Party's position as he does so, inferences that would be meaningful to the Second Party if the Second Party was making honest and reasoned presentations, and inferences that could be potentially adverse to the First Party if the fixed conditions did not reflect the honest and reasoned position of the First Party (see generally, in this regard, note 11, supra).

Conversely, it is, precisely, the highly accommodating nature of the environment into which the First Party thrusts the Second Party that permits the First Party, if the fixed conditions for the release of the escrow reflect the First Party's honest and reasoned position, to either achieve a desired outcome or to draw a meaningful and potentially adverse inference in the event that those fixed conditions are not satisfied (see generally, in this regard, note 7 and note 11, supra).[15]

It is respectfully submitted that the non-obviousness of the invention is evident from the extent to which it contravenes and "teaches away" from (a) the arrangements employed in traditional escrow arrangements (which arrangements are described supra, (b) the traditional methods employed by parties who are attempting to make unilateral progress in non-productive bargaining relationships, such as the methods employed in legal and military conflicts (discussed supra), and (3) the arrangements that have historically been developed in an effort to ameliorate the problems to which legal and military conflicts give rise (discussed supra). For example, in marked contrast to the approaches that have historically been developed in response to the "felt need" for solutions to legal and military conflict, such as systems that allow the parties to mutually agree to utilize a binding appraisal, mediation, arbitration, or similar voluntary, symmetrical process, the asymmetrical system that comprises the invention described in this application allows a party (either as a First Party or as a Second Party) to discretely and unilaterally pursue his own interests, as defined by that party alone, without having to enter into any sort of interim agreement with, or having to signify any willingness to compromise or negotiate with, the other side. However, the method of unilateral action that is embodied in the invention also differs fundamentally from the methods of unilateral action that are manifested in legal and military conflict, because the invention "teaches away" from the approach whereby a party seeking to make unilateral progress in a non-cooperative bargaining relationship attempts to project explicit, credible threats or other significant signals or forms of energy to the other side in an effort to force an alteration in the other side's position. Instead, by providing an escrow arrangement that "teaches away" from and does not employ the traditional escrow methods of (i) bilateral agreement, (ii) full disclosure of the conditions for a release of the escrow, and (iii) disclosure of the fact and contents of any presentation made in an effort to secure the escrow's release (see, discussion infra), the invention provides a party seeking to make unilateral progress within the context of a non-cooperative bargaining relationship as it then exists with a "device or method that does not involve any initial exchange of potentially significant information (i.e. of any energy or 'signals') between the involved parties, but which instead allows and [gives incentives to] each party involved in a non-cooperative bargaining relationship to send a signal conveying that party's position to an intermediate screen, through which no such signal may pass or be perceived by the other side unless it arrives at a point on the screen that corresponds precisely with a point arrived at by a signal sent forth from the other side." (See generally, in this regard, the discussion supra at note 4 and note 12). It is, moreover, respectfully submitted that the non-obviousness of the invention is evident from the fact that it not only "teaches away" from, but is fundamentally antithetical to, the historical approaches referred to above. More specifically, the invention treats mistrust between the parties, a conviction by one party that the other party will not advance a reasonable position, and a reluctance or refusal by at least one party to disclose his true position or to signify any willingness to negotiate, compromise, or enter into any sort of interim agreement with the other side, as a source of energy to give power to the invention, rather than as a set of obstacles that must be overcome in order for progress to be made. (See generally, in this regard, the discussion supra at note 7, note 11 [16]

(V) Objects of the Invention

The objects of the invention that is the subject of this application may be briefly summarized as follows:

i) To allow a party who is involved in a fundamentally non-cooperative bargaining relationship to take unilateral steps in pursuit of his own interests, without having to signify any willingness to consider compromise with the other side.

ii) To assist a party to a potential transaction who is willing to consummate the transaction under certain definite terms, but who is unwilling to disclose all of those terms to the other side unless and until there is a determination made that those terms are acceptable to the other side, to make a determination as to whether those terms are acceptable without first having to arrive at any interim agreement with, or having to signify any willingness to compromise or negotiate with, the other side.

iii) To assist parties who are negotiating transactions on behalf of or for the benefit of persons to whom they owe a fiduciary or similar obligation and who are seeking to establish whether or not a given outcome with respect to that transaction is acceptable to the other side, to make that determination without having to make full disclosures to, or having to signify a willingness to compromise or negotiate with, the other side.

iv) To provide parties who are contemplating a transaction with an incentive to reflect on and come to a reasoned decision in their own minds as to what might constitute an acceptable valuation or outcome for the transaction.

v) To provide parties who have reached an apparent deadlock in negotiations with a mechanism for either breaking the deadlock or confirming that a deadlock has in fact been reached.

vi) To provide a party who lacks confidence in his own ability to negotiate, or who lacks confidence in the capacity of the other side to negotiate in good faith, with an opportunity to seek a result that said party deems to be acceptable.

(Further objects and advantages will become apparent from a further consideration of this Disclosure and the ensuing description).

BRIEF SUMMARY OF THE INVENTION

The invention that is the subject matter of this Application is a method or system that comprises correlating data defining a fixed condition or set of fixed conditions for a release of escrow, which conditions have not been fully disclosed to a second party, with an indefinite number of confidential presentations by said second party seeking to satisfy all of said fixed conditions or establish that all of said fixed conditions have been satisfied, and which does not disclose the fact or contents of any such presentation unless the presentation results in a determination that all of said fixed conditions have been satisfied.

Because the invention consists of a method or system for processing escrow transactions, it involves, as a preliminary matter, the use of certain conventional steps that are commonly utilized in escrow arrangements. More specifically, as was noted within the description of the "Art of Escrow" appearing supra:

[As in] such traditional arrangements, a party (the "First Party") places something that is of value (the "escrow") into the hands of a neutral party (the "Escrow Agent"), and expressly authorizes the Escrow Agent, in a contractual undertaking between the First Party and the Escrow Agent (the "Escrow Contract"), to release the escrow into the hands of a second party (the "Second Party") if, within a period of time specified by the First Party (the "Escrow Period"), certain conditions specified within the Escrow Contract are satisfied. The conditions are "fixed conditions" in the sense that they cannot be withdrawn or altered during the Escrow Period. During the Escrow Period, the Second Party is provided with an opportunity to make presentations of documents or other data attempting to satisfy all of those fixed conditions or establish that all of those fixed conditions have been satisfied (a "presentation"). In the event that the fixed conditions have not been satisfied by the end of the Escrow Period, the Escrow Contract obliges the Escrow Agent to return the original escrow to the First Party. In the event that all of the fixed conditions have been satisfied, then that fact is disclosed to each of the parties, resulting in an exchange of the consideration that each was seeking. The arrangement between the parties is such that the First Party will have a cause of action against the Escrow Agent if the Escrow Agent fails to meet its obligations, and the Second Party will have a cause of action against the First Party and, potentially, the Escrow Agent if the fixed conditions are satisfied within the Escrow Period but the escrow is not released.

However, in direct contravention of traditional escrow arrangements, in which all of the fixed conditions for a release of the escrow are fully disclosed and agreed to by all of the parties in advance in order to reduce the possibility of any misunderstandings between the parties, one or more of the fixed conditions are, under the escrow system that is the subject of this Application (the "System" or the "invention"), not fully disclosed to or agreed to in advance by the Second Party. Instead, the First Party enters data into the System defining all of the fixed conditions for a release of the escrow and designates one or more of those fixed conditions as conditions that the First Party is not willing to have the System fully disclose to the Second Party unless and until a determination is made by the System that all of the fixed conditions have been satisfied (such an undisclosed condition or set of conditions is hereinafter referred to as an "undisclosed fixed condition"). The System then (i) advises the Second Party about the existence of the undisclosed fixed condition, (ii) provides the Second Party with a description of the general nature of the undisclosed fixed condition (such as that it consists of an undisclosed dollar amount that the Second Party would have to agree to pay in exchange for the escrow), sufficient to permit the Second Party to make a presentation of data seeking to satisfy same or establish that it has been satisfied (such as by presenting a contractual undertaking to pay a specified amount in exchange for the escrow), and (iii) provides the Second Party with an opportunity, throughout the Escrow Period, to make an indefinite number of presentations of data to the System in an effort to obtain a determination that all of the fixed conditions for a release of escrow have been satisfied.

In addition, and in further contravention of the methods employed in traditional escrow arrangements, the System that is the subject of this Application does not provide the First Party with any information concerning the fact or contents of any presentation made by the Second Party in an effort to satisfy the fixed conditions for a release of the escrow or establish that those conditions have been satisfied unless that presentation results in a determination that all of the fixed conditions have been satisfied. Thus, any presentation submitted by the Second Party to the System in an effort to obtain a determination that all of the fixed conditions for a release of the escrow have been satisfied constitutes a "confidential presentation," the fact and contents of which will not be disclosed to the First Party unless and until a determination is made that it has resulted in a determination that all of the fixed conditions have been satisfied. Although, in contrast to most traditional escrow arrangements, the Second Party is not a party to a contract with the First Party under the System described herein, the Second Party is identified as an intended third party beneficiary of the contractual obligations owed by and between the other parties, giving the Second Party a right to bring a cause of action against one or more of those parties in the event that there is a breach of an obligation with respect to which the Second Party is an intended beneficiary.[17]

If, upon comparing the data presented in a given confidential presentation with the fixed conditions, the System determines that the confidential presentation does not satisfy all of the fixed conditions or establish that they have been satisfied, then the System returns that confidential presentation to the Second Party and invites the Second Party to submit another confidential presentation, an invitation that is repeated on each such occasion until the Escrow Period comes to an end. In the event that there is a determination by the System that all of the fixed conditions have been satisfied, then, as in traditional escrow arrangements, that fact is disclosed to each of the parties, resulting in an exchange of the consideration that each was seeking. However, in the event that there is a determination by the System that the fixed conditions have not been satisfied by the end of the Escrow Period, then the undisclosed fixed condition remains undisclosed, any confidential presentations that were submitted by the Second Party remain confidential, and the First Party cannot determine from the System whether any confidential presentations were submitted at all.

BRIEF DESCRIPTION OF THE SEVERAL VIEWS OF THE DRAWING(S)

The following drawings have been submitted:
FIG. 1: A Step Diagram of the Method Described in claim 1.
FIG. 2: A Step Diagram of the Method Described in claims 1, 4 & 5.
FIG. 3: A Step Diagram of the Method Described in claims 1, 6 & 7.

DETAILED DESCRIPTION OF THE INVENTION (1) Introduction

As noted above, the invention that is the subject matter of this Application is a method or system that comprises correlating data defining a fixed condition or set of fixed conditions for a release of escrow, which conditions have not been fully disclosed to a second party, with an indefinite number of confidential presentations by said second party seeking to satisfy all of said fixed conditions or establish that all of said fixed conditions have been satisfied, and which does not disclose that any such presentation has been made unless such a presentation results in a determination that all of said fixed conditions have been satisfied.

By way of introduction to the material that follows, it should be noted that the terms used in this section and within the ensuing claims have the same meaning as is given to those terms within the balance of this Disclosure, including within the section of this disclosure entitled "Brief Summary of the Invention," wherein many of those terms are specifically defined. Furthermore, and as a definitional matter, it should be noted that that there is no substantive difference between a confidential presentation which "satisfies" a fixed condition and a confidential presentation which "establishes" the satisfaction of that fixed condition, as those terms are used from time to time within this Disclosure. The use of such alternative language within this Disclosure is intended to simply address the fact that, depending upon the manner in which the fixed conditions have been defined in the data submitted by the First Party, it may be more accurate from a semantic perspective to characterize the submission of a specific confidential presentation as constituting, itself, the satisfaction of the fixed conditions (i.e., the "performance or fulfillment of some condition," as referred to within the definition of escrow appearing in note 1, supra), or it may be more accurate from a semantic perspective to refer to that same confidential presentation as having established that the condition has been satisfied (i.e., that the "performance or fulfillment of some condition" has taken place.) For example, if the data submitted by the First Party defines, as a fixed condition for a release of the escrow, the submission of a certified copy of a board of directors vote assenting to a sale of a given asset, then a confidential presentation which includes such a certified copy will, itself, constitute the satisfaction of that condition. Alternatively, if the data provided by the First Party instead simply defines the occurrence of that vote as a fixed condition for a release of the escrow, then the submission of a certified copy of the vote would more properly be characterized as "establishing" that the fixed condition has been satisfied.

It should also be noted, as a preliminary matter, that the First Party's ability to secure a satisfaction of all of the fixed conditions through the use of the System, or, alternatively but just as importantly, to derive a meaningful inference in the event that a release of the escrow is not achieved, will increase in direct proportion to the extent to which the First Party has caused the System to be configured in a manner so as to increase the Second Party's ability to utilize it with ease and with confidence. (See generally, in this regard, the discussion supra and at note 11). Thus, from the perspective of all parties, the preferred embodiment of the invention in any given usage will be the embodiment that maximizes the ability of the Second Party to use it with ease and confidence. As is noted in the discussion of specific aspects of the System set forth below, the Second Party's ease and confidence with respect to several of those aspects will be enhanced through a computerized, on-line embodiment, and such an embodiment is thus preferable from the perspective all parties.

Finally, it should be noted by way of introduction that, although the preferred embodiment of the invention that is the subject of this Application consists of a computerized, on-line embodiment, this Application does not consist of an attempt to simply patent a computerized or on-line version of a pre-existing, historical method of conducting escrow transactions. To the contrary, the method or system that is described within this Disclosure is, to the best of the Inventor's knowledge and belief, entirely novel and without historical precedent.

(2) Description of the System Administrator

The System is capable of engaging in escrow transactions because it is administered and operated by a person or entity (the "System Administrator") that is legally distinct from the parties utilizing the System. As with traditional escrow agents, such as bankers and lawyers who provide escrow services in the ordinary course of their business, the System Administrator is neutral, and his obligations to the parties are limited to obligations that he elects to undertake, either through simple contracts with, or through representations made to, those parties.[18] In order for the System Administrator to be effective and enjoy the trust of parties utilizing the System, the System Administrator needs to be able to satisfy the expectations that parties generally have when they utilize a lawyer or banker as an escrow agent in more traditional escrow transactions. These expectations include an ability to recognize and disclose any potential conflicts of interest, to hold information in strict confidence, to hold documents and data in secure locations, to ensure that the conditions for a release of the escrow are set forth without ambiguity, to make accurate determinations as to whether the conditions for a release of the escrow have been met, and to engage in secure transactions. For this reason, the System will in many instances perform best if it is administered by an entity such as a law firm or bank that already provides escrow services.

(3) Description of the Escrow

The escrow deposited by the First Party consists of something that is of value to another party. It may consist of something that has value that is self-actuating, such as a cashier's check, deed, or deposit of currency, or something less tangible, such as a contractual undertaking, or it may consist of a combination of both.

In order to derive maximum benefit from the use of the System, the First Party will want the escrow to be in a form that maximizes its attractiveness to the Second Party, as this will enhance the prospect that it will lead to a satisfaction of the conditions desired by the First Party or, if those conditions are not satisfied and the First Party has utilized the System in good faith, enhance the First Party's ability to draw meaningful inferences from the failure of the Second Party to achieve a release of the escrow. For example, a contractual undertaking to deliver something of value to the Second Party in the future, such as a contractual undertaking to pay money, or to deliver an assignment or bill of sale, provides the Second Party with something of value, in that a breach of the undertaking will give the Second Party a cause of action against the First Party. However, the deposit of such a contractual undertaking as escrow will not be as effective as would a deposit of the sought after object itself, such as a deposit of the assignment or bill of sale that was being sought by the Second Party or, in a situation involving a payment of money, a deposit of the currency itself, or of a certified check or cashier's check, as opposed to a promissory note.[19] The System will perform best when the escrow is deposited in a form that is objectively reasonable and customary given the nature of the transaction itself. Where the nature of the transaction is such that the First Party would ordinarily be expected to deliver a specific object, or be expected to deliver a contractual undertaking that included certain standard form terms and provisions, the First Party has an incentive to meet those expectations. In order to assist the First Party in meeting those expectations, the System Administrator may wish to provide the First Party with access to standardized contractual language and formats, as discussed supra.

(4) Description of the Initial Delivery of the Escrow

The escrow is, by definition, and as noted in the definition set forth supra at note 1, "delivered to a third person, to be delivered by him to the grantee only upon the performance or fulfillment of some condition. The deposit of the escrow places it beyond the control of the grantor; but no title passes until the fulfillment of the condition." The escrow is thus initially delivered by the First Party (i.e., the "grantor" as referred to in above-quoted definition) to a person or entity that is a "third person," i.e., someone other than the grantor or the grantee. (The Second Party will in most instances be the grantee, i.e., the person or entity to whom the escrow would be delivered upon a determination that all of the fixed conditions had been satisfied, but there are many instances in which the Second Party will be someone other than the grantee who is seeking to cause the escrow to be released to the grantee, either to further the interests of the grantee or, by virtue of some relationship that the Second Party has with the grantee or the escrow itself, to further the Second Party's own interests.) The "third person" to whom the escrow is delivered is, by definition, the Escrow Agent. It is generally preferable to have the System Administrator serve as the Escrow Agent, as this increases the simplicity of the arrangement and thereby enhances its attractiveness to the Second Party. However, there is no inherent requirement that the System Administrator serve as the Escrow Agent. For example, in many instances the nature of the relationship between the parties, or the nature of the contemplated transaction or of the escrow itself, will be such that a person or entity other than the System Administrator may more effectively perform the role of the Escrow Agent.

If the escrow delivered to the Escrow Agent consists of tangible property, the physical delivery of that tangible property may take place by mail or courier service. If the original escrow consists of a contractual engagement, the delivery of that engagement may also be accomplished by mail or courier service, or it may be accomplished via transmission over a global communication service, such as via facsimile transmission or through transmission via e-mail. Transfers of currency may be accomplished by wire transfer. In any case, the First Party will wish to ensure that the manner in which he delivers the original escrow does not unnecessarily serve to reduce its attractiveness to the Second Party. (Thus, for example, in cases where the escrow includes a written contractual engagement that has been signed by the First Party but deposited via facsimile transmission, the First Party would want to include within the contractual undertaking a clause to the effect that "a photocopy or facsimile transmission of a signed counterpart of this contractual undertaking shall have the same force and effect as an original.") In the best use of the System, the System Administrator will alert the First Party to this issue and assist the First Party in ensuring that the method of the deposit does not adversely impact the attractiveness of the escrow to the Second Party.

(5) Description of the Escrow Contract

The original escrow is held in the same manner in which escrow is routinely held by Escrow Agents such as law firms and banks. The escrow is placed in a secure location, beyond the control of the First Party. The escrow is held in accordance with an escrow contract (again, the "Escrow Contract"), similar in many respects to the contracts that have traditionally been used by law firms and banks that serve as escrow agents, but containing some unique aspects. (In cases where the System Administrator does not serve as the Escrow Agent, the contractual obligations undertaken by the Escrow Agent include an obligation to release the escrow upon a determination by the System that all of the fixed conditions for a release of the escrow had been satisfied. In such cases, the rights and obligations of the First Party, the Escrow Agent, and the System Administrator are either set forth in a single contract between all three of those parties, or in a set of contracts between the First Party and, on the one hand, the Escrow Agent and, on the other hand, the System Administrator. All such contractual arrangements would fall within the definition of the term "Escrow Contract," as that term is used within this Disclosure.) In the preferred embodiment of the System, the Escrow Contract includes the following written material:

(i) A full and complete description of the escrow (with copies of any documents comprising the escrow attached to the Escrow Contract as exhibits and marked as unenforceable copies).

(ii) An irrevocable assignment from the First Party to the Escrow Agent of control over the escrow for a specified period of time (i.e., and again, the "Escrow Period").

(iii) An irrevocable agreement that, during that Escrow Period, no changes or modifications will be sought or permitted with respect to the escrow or the Escrow Contract, including the exhibits to the Escrow Contract.

(iv) An irrevocable instruction from the First Party, directing and authorizing the Escrow Agent to cause the escrow to be released to a Second Party identified by the First Party within the Escrow Contract in the event that the System determines that certain conditions specified by the First Party and set forth on an exhibit to the Escrow Contract have been satisfied within the Escrow Period.

(v) An exhibit as referred to in the preceding subparagraph, setting forth the conditions for a release of the escrow specified by the First Party, and including a designation by the First Party of conditions that the First Party is willing to have disclosed to the Second Party without limitation (i.e., the disclosed fixed conditions,) and a condition or set of conditions that the First Party is not willing to have disclosed to the Second Party (i.e., the undisclosed fixed condition) unless and until the System makes a determination that all of the fixed conditions set forth on the exhibit have been satisfied.

(vi) An exhibit constituting a format approved by the First Party for use by the Second Party in the event that the Second Party wishes to make presentations to the System in an effort to satisfy all of the fixed conditions for release of the escrow or establish that all of said fixed conditions have been satisfied. This exhibit is in the form of a written contractual engagement setting forth the disclosed fixed conditions, or incorporating by reference documents which set forth any disclosed fixed conditions, and providing a blank space into which the Second Party may insert data seeking to satisfy the undisclosed fixed condition. The format discloses to the Second Party the nature of the data that would need to be inserted in an effort to satisfy the undisclosed fixed condition and, in the most simple use of the System, the nature of that data is such that it can be expressed through the insertion of a numerical term (such as a dollar amount, a percentage figure, or a term of years or other period of time) or a proper name known to both of the parties (such as the name of an individual who is under an existing contract to one or both of the parties, or the name of a geographic area or geopolitical entity, such as the name of a member of the South East Asian Treaty Association or other international organization.) The format of this exhibit is such that, if the Second Party elects to utilize it and inserts and submits data satisfying the undisclosed fixed condition, it constitutes a contractual undertaking by the Second Party that satisfies all of the fixed conditions specified by the First Party and results in a release of the escrow. (If the Second Party inserts data that does not satisfy all of the fixed conditions, then, as noted elsewhere, the System advises the Second Party of that fact and provides the Second Party with an opportunity to submit alternative data, along with an ongoing assurance that the System will not disclose that data, or disclose the fact that the Second Party has submitted any presentations at all, unless the data set forth in a given presentation results in a determination that all of the fixed conditions for a release of the escrow have been satisfied.)

(vii) An irrevocable waiver by the First Party of any right to seek from the System or from the Second Party any information concerning any use of the System by the Second Party unless the data set forth in a confidential presentation results in a determination by the System that all of the fixed conditions for a release of the escrow have been satisfied.

(viii) An irrevocable acknowledgment that the Second Party is an intended third-party beneficiary of the Escrow Contract, with the right to bring a cause of action for damages or for specific performance in the event of a breach or failure to perform any of the provisions of the Escrow Contract with respect to which the Second Party is identified as an intended beneficiary.

(6) Description of the System's Initial Interaction with a Designated Second Party As was indicated in subparagraph (iv) of the preceding section, the identity of the Second Party is set forth by the First Party within the Escrow Contract. However, the First Party will wish to ensure that a person or entity that communicates with the System in the capacity of a Second Party is in fact the Second Party designated by the First Party. Accordingly, in the preferred embodiment of the System, the System generates a password which the First Party can then cause to be delivered to the Second Party in a manner that the First Party deems to be secure and appropriate. In addition, if instructed to do so by the First Party, the System may require a party utilizing the password to provide additional identifying information, analogous to the additional information that is commonly required to progress through secure websites, such as credit card information. In addition, where the Second Party is a corporate, political or other entity, as distinct from an individual, the System may, if instructed to do so by the First Party, require an individual utilizing the password to provide evidence of that individual's authority to act on behalf of the Second Party, such as by providing the System with a certified copy of a vote by a board of directors authorizing the individual to utilize the System on the Second Party's behalf. In the preferred embodiment of the System, a party using the initial password is able to contact the System and obtain general information in the form of written representations from the System with respect to the general manner in which the System operates, its confidential features, and its potential benefits. However, the System does not engage in any substantive interactions with a Second Party, such as by providing him with a full description of the escrow or any information concerning the fixed conditions for a release of the escrow, unless and until the Second Party has provided the required information with respect to identification and authority and capacity to act. In the preferred embodiment of the System, a party who has utilized the initial password and then provided all required additional information with respect to his identity and/or authority and capacity to act is issued a second password, permitting him to reach a level of the System that cannot be reached by someone who has access to the initial password but who fails to satisfy the additional requirements.

(7) Description of the Manner in which the System Provides the Second Party with Information Concerning the Escrow and the Escrow Contract After the provision of all required information with respect to identification, authority and capacity to act, the System provides the Second Party with a copy of the Escrow Contract, including all of the written material identified in Section 5 above, but excluding the exhibit referred to in subparagraph (v) of that Section (specifying the undisclosed fixed condition for a release of the escrow). The System thus provides the Second party with a description of the original escrow (including copies of any documents comprising the escrow), a description of the respective rights and obligations of the First Party and the System with respect to the escrow (including the fact that the Escrow Contract and its various exhibits cannot be modified during the Escrow Period), and a disclosure of the Second Party's status as an intended beneficiary of the Escrow Contract with a right to bring a cause of action to enforce its terms. In the preferred embodiment of the System, the Second Party is also provided with a representation by the System Administrator that these descriptions and disclosures are true and accurate, thus providing the Second Party with a cause of action against the System Administrator in the event that the representation is false and the Second Party suffers harm as a result of the Second Party's reasonable reliance upon that representation.

(8) Description of the Manner in which the System Provides the Second Party with Information about the Disclosed and Undisclosed Conditions for a Release of the Escrow As noted in the preceding Section, the System provides the Second Party with a copy of the Escrow Contract, including all of the written material identified in Section 5 above, but excluding the exhibit referred to in subparagraph (v) of Section 5 (specifying the undisclosed fixed condition for a release of the escrow). However, the existence of the undisclosed fixed condition and the existence of that exhibit are disclosed to the Second Party, because they are explicitly referred to within the Escrow Contract, as noted a subparagraph (iv) of Section 5 above. The parameters of the disclosures made to the Second Party with respect to the fixed conditions for a release of the escrow are defined by a different exhibit, which is provided to the Second Party and which is referred to at subparagraph (vi) of Section 5 above. As noted therein, that exhibit consists of:

An exhibit . . . in the form of a written contractual undertaking setting forth any disclosed fixed conditions and providing a blank space into which the Second Party may insert data seeking to satisfy the undisclosed fixed condition. The format discloses to the Second Party the nature of the data that would need to be inserted in an effort to satisfy the undisclosed fixed condition and, in the most simple use of the System, the nature of that data is such that it can be expressed through the insertion of a numerical term (such as a dollar amount, a percentage figure or a term of years or other period of time) or a proper name known to both of the parties . . . .

Thus, by way of a simple example, if the First Party is willing to assign stock to the Second Party in exchange for a promissory note for a specific dollar amount, but the First Party does not wish to disclose the dollar amount that he is willing to accept unless and until the Second Party agrees to pay that dollar amount, the exhibit in question would be in the form of a standard form promissory note, with the dollar amount (the undisclosed fixed condition) left blank, but with all of the other terms of the note desired by the First Party filled in (such as the date of payment, the applicable law, and the remedies for a breach, all of which together would constitute disclosed fixed conditions). The first paragraph of the promissory note would state, in sum and substance, that "For good and valuable consideration, including the immediate delivery to me of a Stock Assignment as depicted in Annex A to this note, duly executed by [the First Party], I [the Second Party] hereby promise to pay to the order of [the First Party], the total amount of [blank where amount is to be inserted] United States dollars, in the form of certified check, on the date and under the terms and conditions set forth below . . . ." The exhibit in question would thus describe the original escrow ("a Stock Assignment as depicted in Annex A to this note, duly executed by [the First Party]"), describe the disclosed fixed conditions for a release of the escrow (the delivery of a promissory note from the Second Party containing "the terms and conditions set forth below") and disclose the nature of the data that would need to be inserted by the Second Party in order to satisfy the undisclosed fixed condition (a numerical term corresponding to an undisclosed amount of "United States dollars," inserted by the Second Party as the face amount of the Promissory Note).[20] Thus, the exhibit in question provides the Second Party with all of the contemplated information concerning the disclosed and undisclosed fixed conditions for a release of the escrow.

(9) Description of the Manner in which the System Permits the Second Party to Submit Presentations in an Effort to Satisfy the Fixed Conditions for a Release of the Escrow In addition to providing information to the Second Party with respect to the disclosed and undisclosed conditions for a release of the escrow, the exhibit referred to in the preceding paragraph also constitutes, as was noted in subparagraph (vi) of Section 5 above:

[A] format approved by the First Party for use by the Second Party in the event that the Second Party wishes to make presentations to the System in an effort to satisfy all of the fixed conditions for release of the escrow. This exhibit is in the form of a written contractual engagement setting forth the disclosed fixed conditions and providing a blank space into which the Second Party may insert data seeking to satisfy . . . the undisclosed fixed condition . . . . The format of this exhibit is such that, if the Second Party elects to utilize it and inserts and submits data satisfying the undisclosed fixed condition, it constitutes a contractual undertaking by the Second Party that satisfies all of the fixed conditions specified by the First Party and results in a release of the escrow.

Thus, by providing the Second Party with the exhibit in question, the System permits the Second Party to submit data into the System in an effort to satisfy all of the fixed conditions.

The method of submission of the exhibit in question, such as via mail, courier service, facsimile transmission or via e-mail, is dictated by the First Party within the Escrow Contract and constitutes one of the disclosed conditions. In the best use of the System, the First Party makes the method of submission as convenient as possible for the Second Party, while at the same time taking steps to ensure that the selected method of submission does not compromise the enforceability of the contractual undertaking set forth in the confidential presentation. For example, the First Party may, in order to facilitate a use of the System by the Second Party, agree to permit the Second Party to make confidential presentations to the System via entries on a website operated by the System Administrator. However, prior to permitting the Second Party to submit a confidential presentation or series of confidential presentations via entries on a website, the First Party will want the System Administrator to require the Second Party to go through a series of protocols on the website, similar to the protocols involved in secure, web-based transactions such as credit card based purchases, or in telephonic banking transactions, so as to confirm that the Second Party intends to be bound by those entries. In the best use of the System, the System Administrator will alert the First Party to the various methods by which the deposit of a confidential presentation with respect to a given, potential transaction may be made convenient for the Second Party, without compromising the enforceability of the contractual undertaking set forth in the presentation. For example, in situations where the escrow consists of a contract signed by the First Party and deposited as escrow, each confidential presentation will, in the best use of the System, be in the same form as the contract that was deposited as escrow (except that it would be signed or otherwise agreed to by the Second Party instead of by the First Party), and will, like the contract deposited as escrow, contain a clause confirming it may be signed (or otherwise agreed to) "in one or more identical counterparts, each of which when so executed and delivered shall constitute a fully enforceable and binding contract."

(10) Description of the Manner in which the System Compares Each Confidential Presentation with the Fixed Conditions The comparison of the disclosed and undisclosed conditions for a release of the escrow with a confidential presentation seeking to satisfy those conditions may be performed by the System in any number of ways depending upon the manner in which the confidential presentation is deposited into the System. In the preferred embodiment of the System, the format that the System provides to the Second Party for the purpose of making such a presentation (as referred to at subparagraph (vi) of Section 5 above), is presented to the Second Party on a website operated by the System Administrator, where that exhibit (and any other material annexed to it or incorporated into it by reference) appears as a distinct web-page in an immutable format (such as a PDF format) except for the portion of the document where the Second Party is invited to input data in an effort to satisfy the undisclosed fixed condition. In the preferred embodiment of the System, the Second Party is able to type a numerical term or proper name into that space on the web-page, and to then elect to enter that data into the website in an effort to satisfy the fixed conditions and thereby reach another level, in the same manner in which a party seeking access to a secured website is able to type in a password or user name and enter that data into the website in an effort to reach another level. Under such circumstances, the System's comparison of the confidential presentation with the fixed conditions for a release of the escrow is similar to the comparison performed when a party enters a password or user name in an effort to obtain access to another level of a secure website.[21]

Thus, in the example cited in Section 8 above, the web-page presented to the Second Party is in the form of the promissory note, all of the terms of which are presented in an immutable format except for a blank area where the Second Party is permitted to insert a proposed numerical term corresponding to the amount of the note in United States Dollars. The immutable terms appearing on that page make clear to the Second Party that, by typing in a numerical term and entering it into the website, the Second Party will, in the event that the numerical term satisfied the undisclosed fixed condition, be binding himself to all of the terms appearing on, or incorporated into, that web-page. The Second Party's obligations in this regard are also made clear by the protocols that he is required to pass through on the website in order to enter any given confidential presentation. In the event that the numerical term entered by the Second Party does not satisfy the undisclosed fixed condition, the Second Party is advised of that fact and invited to enter an alternative term, just as a party who enters an improper password or user name in an attempt to proceed to another level of a secured web-site receives such advice and such an invitation.

In the event that the numerical term satisfies the undisclosed fixed condition, then, by virtue of the Second Party's having bound himself to that term and to all of the other terms appearing on, or incorporated into, that web-page, the Second Party will have succeeded in satisfying all of the fixed conditions for a release of the escrow. Under those circumstances, just as a party who is seeking to enter a secured website is allowed to do so upon entering a proper password, the Second Party is allowed to proceed to another level of the System Administrator's website, where he receives confirmation that he is entitled to a release of the escrow in accordance with the terms of the Escrow Contract.

(11) Description of the Manner in which the System Treats Each Presentation Made by the Second Party as Confidential As noted a subparagraph (vii) of Section 5 above, the Escrow Contract includes the following provision:

An irrevocable waiver by the First Party of any right to seek from the System or from the Second Party any information concerning any use of the System by the Second Party unless the System makes a determination that a presentation has been deposited that satisfies all of the conditions for a release of the escrow.

In addition, and as was noted at Section 6 above, the Second Party, when he utilizes the initial password, is able to obtain general information in the form of written representations from the System with respect to the general manner in which the System operates, its confidential features, and its potential benefits. In the preferred embodiment of the System, these written representations include a representation to the Second Party to the effect that, unless the data set forth in a given confidential presentation results in a determination by the System that all of the fixed conditions for a release of the escrow have been satisfied, the fact and contents of any such confidential presentation will not be disclosed to any third party, except to the extent that such disclosure is compelled under formal legal process, such as by the issuance of a subpoena issued by a court of competent jurisdiction, in which event notice of that legal process shall be given by the System Administrator to the Second Party as soon as is reasonably practicable in order to afford the Second Party with an opportunity to object to any such disclosure.[22]

(12) Description of a Mode of the System Allowing for Alternative Disclosed Conditions In order to address the possibility that some of the disclosed fixed conditions might consist of conditions that the First Party would like to propose but that he would not want to insist upon in the event that the Second Party rejected them, the First Party has the option of having the System configured so as to permit the Second Party to signify his rejection of certain disclosed fixed conditions, in which event the System may present the Second Party with one or more sets of alternative disclosed fixed conditions, in a sequence set by the First Party. The alternative disclosed fixed conditions, and the sequence in question, are specified in the exhibit described in subparagraph (v) of Section 5 (i.e., the exhibit specifying the disclosed and undisclosed fixed conditions for a release of the escrow).

In the event that the First Party's willingness to agree to an alternative with respect to any one of the original disclosed fixed conditions is conditioned upon changes to the undisclosed fixed conditions, the extent of any such changes to those undisclosed conditions is set forth in the above-referenced exhibit to the Escrow Contract as well. (For example, if the number of years during which a lease or license would be in effect was one of the disclosed fixed conditions, and the amount of the monthly payments due under the lease or license was an undisclosed fixed condition, the First Party would normally want to refuse to agree to any reduction in years that might be sought by the Second Party unless there was an increase in the amount of monthly payments.)

(13) Description of a Mode of the System Allowing for Multiple Undisclosed Conditions In some instances, the First Party may wish to utilize more than one undisclosed fixed condition, and the data necessary to satisfy one of those undisclosed conditions may then vary depending upon the data submitted with respect to another. For example, in the situation noted in the preceding section, a First Party who was willing to grant a lease or license to a Second Party, but who had no preference with respect to the term of years, might elect to designate both the term of years and the amount of the monthly payments as undisclosed terms, even though he would want to receive different amounts of monthly payments depending upon the term of years. In such a situation, the First Party has the option of having the System configured so as to permit the Second Party to deposit a confidential presentation setting forth both a term of years and a proposed monthly payment. The confidential presentation made with respect to the monthly payment might be satisfactory, or unsatisfactory, depending upon the confidential presentation made with respect to the term of years. The confluence of data necessary to satisfy the undisclosed fixed conditions would, under such circumstances, be specified in the exhibit described in subparagraph (v) of Section 5 (i.e., the exhibit specifying the disclosed and undisclosed fixed conditions for a release of the escrow).

(14) Description of a Mode of the System Allowing for Multiple Second Parties In the event that the First Party identifies more than one Second Party within the Escrow Contract, the fact that more than one Second Party has been so identified is, in the preferred embodiment of the System, disclosed to each Second Party (although the identity of the other second parties may, or may not, be disclosed, at the election of the First Party). In addition, under those circumstances, the System will advise each Second Party that, upon a determination by the System that a confidential presentation deposited by one of the second parties has satisfied the conditions for a release of the escrow, no further confidential presentations will be accepted by the System.

(15) Description of a Mode of the System Allowing for the Presentation of an Automated Series of Confidential Proposals In order to facilitate ease of use, the System may be configured so that, where an undisclosed fixed condition consists of a numerical term, a Second Party making confidential presentations with respect to that numerical term may elect to have the System automatically continue to increase or decrease the Second Party's proposed numerical term until the earlier of (a) a time at which the proposed numerical term reaches a number that is identical to and satisfies the undisclosed fixed condition, or (b) the time at which the proposed numerical term reaches a number designated by the Second Party as an end point for further proposals at that time. This is accomplished by having the System compare the number that is designated by the Second Party as an end-point with the number that was designated by the First Party as satisfying the undisclosed fixed condition. In the event that the number designated by the Second Party as an end-point meets or overlaps with the number designated by the First Party as satisfying the undisclosed fixed condition, the Second Party will be deemed to have deposited a confidential presentation setting forth the number designated by the First Party, and the undisclosed fixed condition will accordingly be deemed to have been satisfied.

(16) Description of a Mode of the System Allowing for the Provision of Affidavits as to a Party's Use of the System in the Event that a Release of the Escrow is not Achieved The System may be configured and, in the preferred embodiment of the System, is configured so that, in the event that a release of the escrow has not been achieved by the end of the Escrow Period, each party may obtain an affidavit or similar certification from the System, attesting to (a) the general method employed by the System, (b) that party's use of the system, (c) the precise data inserted by that party into the System, and (d) the fact that the data, if any, submitted by the other side did not correspond to that data. The issuance of such an affidavit or similar certification allows the party to whom it is issued to establish that the position reflected in the data that he submitted had effectively been rejected by the other side (see, e.g., note 11, supra), and thus provides that party with something that may prove to be of significant value to that party, and that may prove to be substantially detrimental to the other side, in instances where a release of the escrow is not achieved, such as in cases where one of the parties is acting in a fiduciary capacity (as discussed supra). See also, with regard to the utility of this mode of the invention, the discussion supra at note 7.

(17) Conclusion: Ramifications and Scope of the Invention

It will be appreciated that the Asymmetrical Escrow System that is the subject of this application provides a highly useable and easy to administer system whereby parties who find themselves in a non-cooperative bargaining relationship may take unilateral steps to determine whether an outcome that they deem to be acceptable is acceptable to the other side, without first having to fully disclose that proposed outcome, or having to signify any willingness to consider compromise, to the other side. A working version of the System could be readily built or made from the information contained herein by any law firm, bank or other party with experience in the escrow field, and could easily be administered by such parties and used by anyone competent to engage in traditional escrow transactions.

While the foregoing description contains many specifications, they should not be construed as limitations of the scope of the invention, but rather as an exemplification of one preferred embodiment thereof. Many other variations are possible, such as the use of a telephonic, rather than a web-based, platform for the System, the use of computer kiosks at a place of purchase, or such as by having the precise manner in which the System will be used dictated in a pre-existing agreement between the parties (i.e., an agreement that was entered into by the parties prior to the time at which the circumstances giving rise to a non-cooperative bargaining relationship arose, similar to an agreement containing an arbitration provision), or dictated by an entity to whose power both parties are subject, such as a sovereign entity, its court system, or an employer. (In variations where the parties' use of the invention is directed by such an external force, further features may be employed, such as a provision that, where the escrow is not released, a party who ultimately arrives at an outcome less favorable than the outcome embodied in the data that he entered into the System, either as a First or as a Second Party, must bear the costs reasonably incurred by the other party in achieving that outcome following the expiration of the Escrow Period.) Accordingly, the scope of the invention should be determined not by the embodiments described above, but by the appended claims and their legal equivalents.

Notes

Note 1. "Es'crow, n., 1. A deed, bond or other written engagement, delivered to a third person, to be delivered by him to the grantee only upon the performance or fulfillment of some condition. The deposit of the escrow places it beyond the control of the grantor; but no title passes until the fulfillment of the condition." *Webster's New Collegiate Dictionary*, $2^{nd}$ Ed. Escrow arrangements are typically utilized in situations where at least one of the parties to a contemplated transaction lacks trust in the other party's good faith or willingness or ability to perform, with the result that a neutral third person or entity is employed to secure the interests of each party. Persons and entities engaged in the business of providing certain forms of escrow services are subject to governmental regulations (see, e.g., 10 California Code of Regulations §1700, et seq.) and represented by various trade associations, such as the American Escrow Association (http://www.a-e-a.org/) and the California Escrow Association (http://www.ceaescrow.org/).

Note 2. Masculine pronouns are used herein solely for convenience of reference and are intended to have general application.

Note 3. The fact that the conveyance, or non-conveyance, of information relating to a party's position and willingness to consider compromises may play a significant and, potentially, determinative role in various bargaining contexts is intuitively understood and is evident from the efforts made by social psychologists, economists and mathematicians to incorporate such factors into theoretical models of bargaining behavior and mathematical expressions of game theory. See, for one of the seminal works in this area, Schelling, Thomas C., (1960) *The Strategy of Conflict*, Cambridge: Harvard University Press. See generally, for a discussion of attempts to develop bargaining theories and the fundamental role that informational exchange plays in bargaining relationships, Rubin, J. and Brown, B., (1975) *The Social Psychology of Bargaining and Negotiation*, New York: Academic Press, ("[I]t is clear that no . . . theory [of bargaining] yet exists [and that any] theory of bargaining will almost certainly have to include a clear conceptualization of the process of information seeking and disclosure. This process, after all, is what bargaining is all about. It is through the selective, strategic exchange of information that bargainers attempt to discover the other's true preferences, expectations, and intentions, while at the same time revealing as little as possible about their own." Id., at p. 299). See also, for recognition of these same principals within the context of mathematical models of game theory, Fudenberg, D. and Tirole, I., (1983) *Sequential Bargaining with One Sided Incomplete Information, Review of Economic Studies,* 50, 221; and Sobel I, and Takahashi, J., (1983) *A Multi-Stage Model of Bargaining, Review of Economic Studies,* 50, 441-426. For a recognition of the particular difficulties in creating mathematical models of bargaining behavior where not merely one, but both parties, are unwilling to disclose true and accurate information to the other, see Fudenberg, Levine and Tirole, (1985) *Infinite-Horizon Models of Bargaining with One-Sided Incomplete Information, Game Theoretic Models of Bargaining*, A. Roth (ed.), London: Cambridge University Press ("If both player's valuations are private information, the situation is even more complex. We fear that in this case, few generalizations will be possible, and that even for convenient specifications of the functional form of the distributions over the valuations, the problem of characterizing the equilibria will be quite difficult. Cramton . . . is a start in this direction [referring to Cramton. P. C., (1984) *Bargaining with Incomplete Information: An Infinite Horizon Model with Two-Sided Uncertainty, Review of Economic Studies,* 579-593] . . . The non-cooperative approach to bargaining theory is still in its infancy.")

Note 4. It is the perception of the Inventor that the phenomenon is similar that which forms the basis of the Uncertainty Principle in quantum mechanics: in certain contexts, the sending of a signal to an object in an effort to obtain information about the object's current relative position will inevitably result in an alteration of that position, thus precluding the party sending the signal from ever obtaining the information that was being sought (i.e., when the signal is reflected or "bounced back" from the object to the sender of the original signal, the information that is conveyed back to the sender reveals the altered position, but reveals nothing whatsoever about the position of the object independent of its interaction with the signal.) See, e.g., Bohr, Niels, (1958) *Atomic Physics and Human Knowledge*, New York: John Wiley & Sons, Inc ("[A]ny attempt to [obtain the information] would involve an uncontrollable exchange of energy between [the object to be observed] and the measuring instruments which would completely disturb the very energy balance we sought to investigate . . . [A]ny attempt to [measure] . . . will be frustrated by the unavoidable interaction between the . . . objects concerned and the measuring instruments indispensable for that purpose . . . [N]o result of an experiment concerning a phenomenon which, in principle, lies outside the range of classical physics can be interpreted as giving information about independent properties of the objects, but is inherently connected with a definite situation in the description of which the measuring instruments interacting with the objects also enter essentially." Id., at pp. 6-7 and 26). See also, in this regard, Heisenberg, Werner, (1958) *Physics and Philosophy*, New York: Harper & Brothers Publishing, at p. 58. This perception leads, in turn, to a conceptualization of the process of information seeking and disclosure within the context of non-cooperative bargaining which helps to explain the inefficiencies encountered in such forms of bargaining, and which serves to suggest the utility of a measuring device or method that does not involve any initial exchange of potentially significant information (i.e. of any energy or "signals") between the involved parties, but which instead allows and induces each party involved in a non-cooperative bargaining relationship to send a signal conveying that party's position to an intermediate screen, through which no such signal may pass or be perceived by the other side unless it arrives at a point on the screen that corresponds precisely with a point arrived at by a signal sent forth from the other side.

Note 5. See for classic literary expressions of the problems associated with resort to legal conflict, Dickens, Charles, (1853) *Bleak House*, New York: Alfred A Knopf, Inc. ("This is the Court of Chancery, . . . which so exhausts finances, patience, courage, hope, so overthrows the brain and breaks the heart, that there is not an honourable man among its practitioners who would not give—who does not often give—the warning, 'Suffer any wrong that can be done you rather than come here'."). See, for expressions of the problems associated with resort to military conflict, Sassoon, Siegfried, (1928) *On Passing the New Menin Gate*, taken from *Minds at War—Essential Poetry of the First World War in Context*, by David Roberts. Saxon Books, London, 1996 ("Who will remember, passing through this Gate, the unheroic Dead who fed the guns? Who shall absolve the foulness of their fate,—Those doomed, conscripted, unvictorious ones?").

Note 6. While legal and military conflict are typically cited as destructive phenomena giving rise to a "felt need" for methods to facilitate cooperation between parties who are involved in a non-productive relationship, it is respectfully submitted that the historical development of legal systems and military power are, themselves, a response to the "felt need" for unilateral solutions to the inefficiencies associated with non-cooperative bargaining. Put another way, the "art" that has been developed in an effort to find unilateral solutions to actual or apparent deadlocks arising in non-cooperative bargaining relationships consists of the "art" of conflict itself, i.e., the art employed by sovereign entities seeking to make unilateral progress through the projection of credible threats and power, as analyzed and developed in such works as Schelling, Thomas C., (1960) *The Strategy of Conflict*, Cambridge: Harvard University Press; Schelling, Thomas C., (1966) *Arms and Influence*, New Haven: Yale University Press; Fearon, James D., (1995) *Rationalist Explanations for War*, International Organization 49:3, pp. 379-414; and Powell, Robert, (1999) *In the Shadow of Power*, Princeton: Princeton University Press. Insights derived from the art of conflict that have relevance to the current invention are referenced infra at note 10, note 14, and note 15.

Note 7. As shall become apparent through further review and consideration of this Disclosure, a party's election to utilize the invention that is the subject of this application will in many instances be primarily driven by a desire to obtain justification for pursuing something other than a voluntary agreement with the other side, or by a desire to deprive the other party of such justification. Thus, for example, a conviction on the part of one party that the other party will not advance a reasonable position provides an incentive, rather than a disincentive, for a party to utilize the invention and to enter data that reflects a forthcoming and reasonable position. In many instances, the energy generated by the cross-purposes of the parties utilizing the invention will, contrary to the expectations of one or both parties, yield a voluntary agreement that is acceptable to both sides. However, where the use of the invention does not produce such an outcome, it will, if it was properly utilized in good faith by at least one party, provide that party with credible evidence supporting a finding that the parties were at a real, as opposed to a merely apparent, deadlock, and thus provide that party with justification for devoting his resources to pursuing something other than a voluntary agreement with the other side. (See, for example, the discussion infra at note 11.) Thus, irrespective of whether, in any given use, a release of the escrow is achieved, the Asymmetrical Escrow System that is the subject of this application produces a useful, concrete and tangible result.

Note 8. See, for extensive examples and analysis of methods which attempt to convert nonproductive relationships into cooperative relationships, and the "felt need" in this area generally, the bibliographical and other resource material appearing on websites such as http://www.peacemakers.ca/, the website of a Canadian charitable organization dedicated to research on issues such as "conflict transformation and peacemaking." It will be appreciated that these methods reflect the development of an "art of conflict resolution," i.e., the art employed by parties seeking to make bilateral progress through the use of interim agreements, realizations of shared interests, achieving consensus on general notions of fairness, and the like, as analyzed and developed in such works as Fisher, R. and W. Ury, (1983) *Getting to Yes*, New York, Penguin Books. It will also be appreciated that the principles embodied in the "art of conflict resolution" are distinct from, and do not involve a further evolution or application of, the principles embodied in the "art of conflict," as developed by strategic analysts such as Schelling. It will be appreciated that, from the perspective of a party who is seeking to make unilateral progress within the context of a fundamentally non-cooperative relationship, such as where one or more of the parties is unwilling to signify any willingness to negotiate or consider compromise with the other side, the principles developed within the "art of conflict resolution" will be perceived as being of little or no use, and as involving an attempt to simply "wish away" the problem. Such parties routinely reach, instead, for methods employing principles derived from the art and strategy of conflict.

Note 9. Parties who are involved in bargaining relationships frequently retain the services of professional brokers, agents or lawyers, either because they believe that such service providers will assist them in understanding what would constitute a reasonable or acceptable outcome, or because they believe that the money paid to a given service provider will be justified by that service provider's ability to extract, or ability to prevent them from having to make, concessions in the exchanges with the other side. Such service providers will in many instances generate significant value for their clients and serve general societal interests by assisting their clients in coming to a reasoned decision on what would constitute a reasonable or acceptable outcome, and in securing such a result. However, in other instances, either at the behest of their client, or as a result of their client's unwillingness or inability to provide accurate information concerning the client's own true position, or in pursuit of a contingent or other financial interest that they may have in the transaction, such service providers will sometimes contribute to, rather than help to resolve, the problem identified above by providing, or helping their client to provide, distorted information about their client's true position to the other side, or by facilitating a resort to tactics such as intransigence, belligerence, and intimidation. Such activities may be highly beneficial to the client insofar as they may allow the client to achieve a result that far exceeds the result that the client would have achieved if the parties had simply formulated and exchanged honest, reasoned proposals setting forth what they would be willing to accept. However, such an excessive result does not serve any public interest, and the so-called "posturing" that is frequently employed in an effort to produce such excessive results is detrimental to the public interest insofar as it interferes with the ability of individuals, business entities, and governmental authorities to order their affairs in a reasonable and efficient manner. It will be appreciated that entering into an interim agreement to utilize an appraisal, mediation or arbitration process does not eliminate the problem of posturing, but instead simply changes the forum. This is another reason why many parties are unwilling to utilize such methods, as discussed above.

Note 10. The fact that an outcome mutually acceptable to both parties may be formulated independently by each party without exchanges of full information or, indeed, without any communication between the parties at all, may be discerned from the experiments of Thomas C. Schelling, as described in his work, *The Strategy of Conflict*, cited supra at note 3. A further discussion of those experiments appears at pages 250-252 of *The Social Psychology of Bargaining and Negotiation*, cited supra at note 3.

Note 11. For example, and as will be appreciated from a review of the Brief Summary of the Invention, if the undisclosed fixed condition involves a numerical term (such as a dollar amount) and the First Party or Second Party inputs a number that is higher (if the party is a seller) or lower (if the party is a buyer) than the number that that party would actually be willing to agree to, then that number (a "postured number") will not be conveyed to the other side at all unless it corresponds to a number that the other side is willing to accept. Where the numbers do in fact match, the postured number, though perhaps higher or lower than the number that one (or both) of the parties might have ultimately been willing to agree to, nevertheless constitutes the number at which a willing buyer and a willing seller had agreed to exchange the underlying consideration. It is, thus, a fair reflection of the true value of the consideration, benefiting both parties and society as a whole. In situations where the Escrow Period expires without the parties ever having arrived at a matching number, neither party can conclude with any confidence that some desired inference was conveyed to the other side, because that would require knowledge of the number or numbers that the other side had used and, with respect to a Second Party, whether he had used any numbers at all. With respect to the inferences that a party could derive from, as opposed to convey through, a failure to arrive at a matching number, a party who had utilized a postured number would not be able to derive any inference from that failure other than that his postured number (i.e., a number that did not reflect his true position) differed, by some indeterminate degree, from some number that may, or may not, have reflected the true position of the other side, which is an entirely meaningless inference. (In addition, under those circumstances, a party utilizing a postured number would have deprived himself of an opportunity to learn whether a non-postured number would have been acceptable to the other side.) In contrast, a party using a non-postured number (either as a First or as a Second Party) would, if the escrow were not released, be able to reasonably infer that his non-postured number had effectively been rejected (either because there was a genuine disagreement on valuation, or because the other side had failed to use a non-postured number in pursuit of a good faith agreement acceptable to both sides, even though he had no rational basis not to do so). This would be beneficial to a party who had put forth a non-postured number, and would, if the other side had used a postured number, be adverse to the other side, because it would provide the party who had used a non-postured number with justification for devoting his resources to pursuing something other than a voluntary agreement with the other side. (A party could credibly establish the effective rejection of a given valuation by offering proof of the manner in which he had used the invention and of the failure of that use to result in a release of the escrow.) As a result of these aspects of the invention, and as a result of the fact that the First Party's position is "fixed," the First Party has an incentive to carefully consider his true position and to utilize a non-postured number at the time that he initiates the use of the invention, and the Second Party, although he will have a strong incentive to start out with a highly postured number, will have an equally strong incentive to continually reevaluate the reasonableness of his position, and to continually modify his number in a conciliatory direction, as the Escrow Period winds down. See also, with regard to the incentives of the parties, note 7, supra, note 13, infra, and note 14, infra.

Note 12. As was indicated supra at note 4, many parties will have great difficulty coming to a decision as to what would constitute an acceptable outcome, because their understanding of what they, themselves, would ultimately be willing to accept only emerges if and when they receive what they understand to be a credible signal as to the other side's true position via a signal sent, or reflected back, from the other side. As in the quantum field, such a party's own true position "only sharpens into concrete reality when an observation is made. In the absence of an observation [i.e., a signal exchange], the [position] is a ghost. It only materializes [through the signaling process, and] the reality that the [signals] sharpen into focus cannot be separated from the observer and his choice of measurement strategy." (Davies, Paul, (1993) *God and the New Physics*, New York: Simon and Schuster, Inc. at p. 103.) (This need for a credible signal exchange explains why so many lawsuits brought in the United States, ninety percent of which settle prior to trial, do not settle until the parties finally reach "the courthouse steps," i.e., the point at which the credibility of the signals becomes enhanced because the opportunity for further posturing and signaling is about to be brought to an end. Cf. Spier, Kathryn, (1992) *The Dynamics of Pretrial Negotiation, Review of Economic Studies*, p. 93.) Yet, as was also noted supra, at note 10, many other parties are able to identify an acceptable outcome early on, with little or no signaling. For such a party, the "quantum problem" does not arise in his own realization of what would be acceptable, but only in how to communicate it in a credible, effective, and entirely non-prejudicial manner. That is, again, the problem addressed by the invention.

Note 13. See generally, with regard to the Second Party's incentive to respond to the First Party's use of the System, and to modify the data set forth in the Second Party's confidential presentations in a conciliatory direction as the escrow period winds down, the discussion supra at note 11. As previously indicated, this incentive is particularly acute in cases where the Second Party is seeking something that is not available from sources other than the First Party, or where either party is acting in a fiduciary or similar capacity (as discussed supra), or where a failure by the Second Party to achieve a release of the escrow by the end of the escrow period may be utilized by the First Party as justification for cutting off further attempts to arrive at a voluntary agreement. Additional instances in which a First Party's utilization of the invention will place substantial pressure on the Second Party to do the same include situations where the expiration of the escrow period coincides with an external event, such as a legislative vote, court proceeding, financing deadline or expiration of an option period or treaty, that is likely to substantially impact the value of the First Party's escrow or the ability or incentive of one of the parties to pursue a voluntary agreement. See also, with regard to the incentives of the Second Party, note 7, supra.

Note 14. The First Party's incentive to be forthcoming in his formulation of the fixed conditions for a release of the escrow may be further appreciated through reflection on the following, oft quoted passage from Schelling: "There is, however, an outcome; and if we cannot find it in the logic of the situation we may find it in the tactics employed. The purpose of this chapter is to call attention to an important class of tactics, of a kind that is peculiarly appropriate to the logic of indeterminate situations. The essence of these tactics is some voluntary but irreversible sacrifice of freedom of choice. They rest on the paradox that the power to constrain an adversary may depend on the power to bind oneself; that, in bargaining, weakness is often strength, freedom may be freedom to capitulate, and to burn bridges behind one may suffice to undo an opponent." (Quoting from *The Strategy of Conflict*, Chapter 2 ("An Essay on Bargaining") at page 22.) By "fixing" his own bargaining position in a medium that gives him no meaningful opportunity or incentive to try to posture (see, e.g., note 11, supra), and which is highly accommodating to the other side, the First Party engages in a self-sacrifice of bargaining position, effectively burning bridges behind himself that he cannot rebuild for a specified period of time. He thereby enhances the credibility of the signal that he is sending with respect to his own position and simultaneously shifts the bargaining initiative to the other side. However, he does so in a manner that does not involve a full disclosure of his position, or involve an expression of a willingness to move from that position in a direction desired by the other side, thereby allowing him to take unilateral action in pursuit of his own interests without at the same time causing prejudice to his ability to achieve an acceptable outcome. (See also, in this regard, note 7, supra.)

Note 15. In sum, the principles underlying the invention involve (1) a conceptualization of the process of information seeking and disclosure within the context of non-cooperative bargaining that does not involve recourse to mathematical models, but which instead involves recourse to models developed in subatomic physics (2) a perception that the inefficiencies and paradoxes encountered in non-cooperative bargaining, and the limited options available to a party who is seeking to make unilateral progress in a non-cooperative bargaining relationship as it then exists, are to some significant degree attributable to a phenomenon analogous to that which is recognized in Heisenberg's Uncertainty Principle, the potential broader application of which was suggested in the work of Niels Bohr, (3) a recognition that the epistemological limitation taught by the Uncertainty Principle may be overcome in situations where the object being measured is capable of sending, and can be induced to send, a signal revealing its true position to an intermediate screen without any prior exchange of significant energy with the other side, (4) an appreciation of the fact that, as suggested in the work of Schelling, a party involved in a non-cooperative bargaining relationship may, through a self-sacrifice of his own bargaining options, "shift the initiative" to the other side and thereby induce the other side to send signals disclosing its true position, (5) a recognition of the fact that a party could make such a self-sacrifice by committing himself to a fixed bargaining position and placing that position in escrow for a fixed period of time, (6) a realization that, by configuring the escrow system in a non-traditional manner, such that it could be utilized unilaterally by one party, and such that no potentially significant information concerning the position of either party could be revealed to the other unless those positions were identical, the escrow system could (i) prevent a signal sent by one party from interacting with and altering the position of the other; (ii) enhance the willingness of one party to engage in a self-sacrifice of his bargaining options for a set period of time, and (iii) enhance the inducement to the party to whom the bargaining initiative was thus shifted to formulate and send signals revealing his position, and to refine that position and to modify those signals in a conciliatory direction, as that period of time wound down. It is respectfully submitted that the Asymmetrical Escrow System described herein represents a practical application of the above-described principles, which application produces a useful, concrete and tangible result, and that the unprecedented nature of the invention is not attributable to the complexity of those principles or to difficulties in their practical application, but rather to the fact they involve, in combination, a "paradigm shift" in the conceptualization of the process of informational exchange within the context of non-cooperative bargaining. See, e.g., Kuhn, Thomas S., (1962) *The Structure of Scientific Revolutions*, Chicago, Ill.: University of Chicago Press.

Note 16. See generally, with respect to the well-established right of an intended third-party beneficiary to bring a cause of action under such circumstances, the *Restatement (Second) of Contracts*, American Law Institute, §302, ("Unless otherwise agreed between promisor and promisee, a beneficiary of a promise is an intended beneficiary if recognition of a right to performance in the beneficiary is appropriate to effectuate the intention of the parties and . . . the circumstances indicate that the promisee intends to give the beneficiary the benefit of the promised performance"); and Corbin, Arthur L., *A Comprehensive Treatise on the Working Rules of Contract Law* (1951) St. Paul, Minn.: West Publishing Co., §776, at p. 18 ("A third party who is not a promisee and who gave no consideration has an enforceable right by reason of a contract made by two others . . . if the promised performance will be of pecuniary benefit to [the third party] and the contract is so expressed as to give the promisor reason to know that such benefit is contemplated by the promisee as one of the motivating causes of his making the contract.")

Note 17. In situations where the First Party and the Second Party are not both subjects of the same sovereign entity, the First Party has an incentive to select, as a guarantor of the respective obligations of the parties, a sovereign entity or international organization that would be acceptable to the Second Party.

Note 18. It will be appreciated that, where the escrow consists of the consideration that is ultimately being sought by the Second Party, as distinct from a contractual undertaking via which it may be obtained from the First Party, then, from the perspective of the Second Party, the credit-worthiness of the First Party and, indeed, even the very identity of the First Party, may become secondary considerations or fundamentally irrelevant.

Note 19. An alternative example of how the System works may be discerned through an inversion of the roles played by the parties in the above-cited example. More specifically, if the stock assignment is being sought, rather than offered, by the First Party, then the exhibit in question would be in the form of the stock assignment, the escrow would consist of the promissory note, and the undisclosed condition would be embodied in the stock assignment's recitation of the consideration, i.e., "For good and valuable consideration, including the immediate delivery to me of a promissory note as depicted in Annex A to this Assignment, duly executed by [the First Party] in the principal amount of [Blank] United States Dollars, I [the Second Party] hereby irrevocably assign to [the First Party] all of my right, title and interest in and to the stock described below under the terms and conditions set forth below . . . ."

Note 20. See generally, for examples of the patentability of systems which, although substantially different from the System that is the subject of this application (see, e.g., the discussion supra), involve a similar comparison by a neutral party of data submitted by other parties, patents issued with respect to auctions, claim resolution services, and dating (or so-called "matchmaking") services, such as U.S. Pat. No. 6,606,607 (computerized, on-line version of an asymmetrical auction system in which a potential buyer may submit up to three non-confidential monetary bids in an effort to obtain a desired object, each of which will be compared with data provided by the potential seller and responded to in accordance with that data); U.S. Pat. No. 5,794,207 (computerized, on-line version of an asymmetrical reverse auction system in which a potential buyer's proposed terms are fully disclosed to potential sellers, who are then permitted to submit data which is compared to those terms and which will result in a binding contract where the submitted data matches the disclosed terms); U.S. Pat. No. 5,983,205, (computerized, on-line version of a symmetrical joint property division system in which joint owners of multiple items of property are given an equal number of points by a third party and agree to use those points to bid on each item of shared interest, with each item going to the highest bidder for that item, as determined through a data comparison performed by a neutral party); U.S. Pat. No. 6,330,551 (computerized, on-line version of a symmetrical monetary claim resolution system in which, by agreement between two parties involved in a dispute over a monetary claim, a computer operated by a third party compares, in an agreed-upon plurality of rounds, an agreed-upon number of monetary offers made by one party with an agreed-upon number of monetary demands made by the other party, without disclosing the involved dollar amounts unless there is a determination that the dollar amounts selected by the parties in one of those rounds fall within an agreed-upon percentage range, in which event the parties are advised that the monetary claim has been resolved in accordance with their agreement); U.S. Pat. No. 6,766,307 (computerized version of a symmetrical "non-judicial dispute resolution" system which includes compiling and storing data for "implementing a full range of dispute resolution procedures" between a plaintiff and a defendant who enter into a "negotiation agreement," including compiling and storing offers made by the defendant and demands made by the plaintiff, permitting each of the parties to change its offers or demands, informing the parties when such a change has taken place, and not disclosing the contents of those offers and demands unless they fall within a range agreed upon in advance by the parties, in which event the parties are advised that their dispute has been resolved in accordance with their agreement); and U.S. Pat. No. 5,884,272 (Symmetrical dating service system in which confidential data concerning personal preferences relevant to dating compatibility are submitted by multiple parties and compared by a system which then introduces parties who have submitted corresponding data).

Note 21. A similar provision with respect to the undisclosed fixed condition may be set forth within the Escrow Contract.

The invention claimed is:

1. A computerized method for processing escrow transactions comprising the following steps:

a) Receiving first information from a first party into a processor wherein first information contains at least in part data identifying escrow, identifying a second party, specifying a deadline, defining all conditions for a release of said escrow, and specifying at least one of said conditions as a condition that said processor will not fully disclose to said second party unless said processor makes a determination that all of said conditions have been satisfied;

b) Providing said second party with an opportunity, up to said deadline, to make a confidential presentation of second information to said processor;

c) Upon receiving second information prior to said deadline, processing first and second information and determining third information as a function of first and second information wherein third information includes at least in part a determination of whether second information satisfies all of said conditions;

d) Where third information includes a determination that second information satisfies all of said conditions, allowing first party and second party to access third information;

e) Where third information includes a determination that second information does not satisfy all of said conditions, allowing second party to access third information and, up to said deadline, to make a confidential presentation of alternative second information into said processor;

f) On each occasion when second information is presented to said processor prior to said deadline and said second information does not result in a determination that all of said conditions have been satisfied, repeating the steps described at subparagraphs (b) through (e) above;

g) whereby a party that is willing and able to cause the delivery of certain consideration in exchange for the delivery of certain other consideration may obtain a determination as to whether another party is willing and able to cause said exchange to take place, without having to first enter into an interim agreement with, or signify any willingness to negotiate or compromise with, or make full disclosures to, said other party concerning the consideration that is being sought or, in the alternative, offered as part of said exchange.

2. The computerized method described in claim 1, wherein:

a) said processor is accessible, and communications between the parties and the processor are conducted, via a global information network, including the internet, the world-wide web, or wireless or non-wireless telecommunication systems.

3. The computerized method described in claim 1, wherein:

a) said first information also includes in part data comprising a contractual undertaking, which contractual undertaking comprises said escrow; and b) upon a determination that all of said conditions for a release of said escrow have been satisfied, causing said escrow to be released to second party.

4. The computerized method described in claim 1, further comprising:

a) in the event that said processor has received second information from second party but has not made a determination that all of said conditions for a release of said escrow have been satisfied, providing second party with an opportunity to cause said processor to generate and provide second party with a writing attesting to the manner in which second party used said processor and the results of said use.

5. The computerized method described in claim 1, further comprising:
   a) in the event that said processor has received second information from second party but has not made a determination that all of said conditions for a release of said escrow have been satisfied, providing second party with an opportunity to cause said processor to delete and erase all of said second information.

6. The computerized method described in claim 1, further comprising:
   a) in the event that, as of said deadline, said processor has not received second information resulting in a determination that all of said conditions for a release of said escrow have been satisfied, providing first party with an opportunity to cause said processor to generate and provide first party with a writing attesting to the manner in which first party used said processor and the results of said use.

7. The computerized method described in claim 1, further comprising:
   a) in the event that, as of said deadline, said processor has not received second information resulting in a determination that all of said conditions for a release of said escrow have been satisfied, providing first party with an opportunity to cause said processor to delete and erase all of said first information.

\* \* \* \* \*